United States Patent
Falkenberg

(10) Patent No.: US 12,323,868 B2
(45) Date of Patent: *Jun. 3, 2025

(54) HANDOVER PROCEDURES INVOLVING SIDELINK COMMUNICATIONS

(71) Applicant: Toyota Jidosha Kabushiki Kaisha, Toyota (JP)

(72) Inventor: Andreas Falkenberg, Escondido, CA (US)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/419,271

(22) Filed: Jan. 22, 2024

(65) Prior Publication Data

US 2024/0187946 A1   Jun. 6, 2024

Related U.S. Application Data

(63) Continuation of application No. 17/456,826, filed on Nov. 29, 2021, now Pat. No. 11,991,575.

(Continued)

(51) Int. Cl.
*H04W 4/44* (2018.01)
*H04W 4/46* (2018.01)
(Continued)

(52) U.S. Cl.
CPC ............ *H04W 36/033* (2023.05); *H04W 4/44* (2018.02); *H04W 4/46* (2018.02); *H04W 24/08* (2013.01);
(Continued)

(58) Field of Classification Search
CPC ..... H04B 7/02–17; H04B 17/0082–409; H04J 11/0023–0093;
(Continued)

(56) References Cited

U.S. PATENT DOCUMENTS

| 11,991,575 B2 * | 5/2024 | Falkenberg ......... H04W 36/033 |
| 2021/0022055 A1 * | 1/2021 | Tseng .................. H04W 36/362 |
| 2023/0247513 A1 | 8/2023 | Paladugu et al. |

FOREIGN PATENT DOCUMENTS

WO   WO 2021/025609 A1   2/2021

OTHER PUBLICATIONS

ETSI TS 138 331, "5G: NR; Radio Resource Control (RRC); Protocol specification", 3GPP TS 38.331 version 16.1.0 Release 16, (Jul. 2020), 886 pages, (part 1, pp. 1-296).

(Continued)

*Primary Examiner* — Timothy J Weidner
(74) *Attorney, Agent, or Firm* — Finnegan, Henderson, Farabow. Garrett and Dunner, LLP

(57) ABSTRACT

A system, method and apparatus for wireless communications is provided. A user equipment (UE) receives, from a first base station, one or more first messages that include measurement configuration parameters and sidelink parameters associated with a first cell. The UE establishes a sidelink with a second UE based on the sidelink parameters and transmits, to the first base station, a measurement report based on the measurement configuration parameters. Responsive to the measurement report, the UE receives a second message comprising second configuration parameters of a second cell of a second base station. The second configuration parameters do not comprise sidelink parameters. The UE then switches from the first cell of the first base station to the second cell of the second base station. The sidelink of the first cell is handed over to an uplink of the second cell.

28 Claims, 23 Drawing Sheets

Related U.S. Application Data

(60) Provisional application No. 63/119,700, filed on Dec. 1, 2020.

(51) Int. Cl.

| | | |
|---|---|---|
| *H04W 24/08* | (2009.01) | |
| *H04W 24/10* | (2009.01) | |
| *H04W 28/02* | (2009.01) | |
| *H04W 28/08* | (2023.01) | |
| *H04W 36/00* | (2009.01) | |
| *H04W 36/14* | (2009.01) | |
| *H04W 36/30* | (2009.01) | |
| *H04W 36/36* | (2009.01) | |
| *H04W 76/14* | (2018.01) | |
| *H04W 76/15* | (2018.01) | |
| *H04W 84/02* | (2009.01) | |
| *H04W 88/04* | (2009.01) | |
| *H04W 88/06* | (2009.01) | |
| *H04W 88/08* | (2009.01) | |
| *H04W 92/02* | (2009.01) | |
| *H04W 92/10* | (2009.01) | |
| *H04W 92/18* | (2009.01) | |
| *H04W 92/20* | (2009.01) | |

(52) U.S. Cl.
CPC ....... *H04W 24/10* (2013.01); *H04W 28/0205* (2013.01); *H04W 28/0875* (2020.05); *H04W 36/0055* (2013.01); *H04W 36/0058* (2018.08); *H04W 36/0064* (2023.05); *H04W 36/0085* (2018.08); *H04W 36/144* (2023.05); *H04W 36/30* (2013.01); *H04W 36/362* (2023.05); *H04W 76/14* (2018.02); *H04W 76/15* (2018.02); *H04W 84/02* (2013.01); *H04W 88/04* (2013.01); *H04W 88/06* (2013.01); *H04W 88/08* (2013.01); *H04W 92/02* (2013.01); *H04W 92/10* (2013.01); *H04W 92/18* (2013.01); *H04W 92/20* (2013.01)

(58) Field of Classification Search
CPC .. H04J 2011/0003–0096; H04L 5/0001–0098; H04L 67/104–125; H04W 4/30–80; H04W 8/005–245; H04W 24/02–10; H04W 28/02–26; H04W 36/0005–385; H04W 40/24–38; H04W 48/02–20; H04W 56/001–0025; H04W 60/005–06; H04W 72/02–569; H04W 74/002–0891; H04W 76/10–50; H04W 84/005–16; H04W 88/02–12; H04W 92/02–04; H04W 92/10–12; H04W 92/16–22
See application file for complete search history.

(56) References Cited

OTHER PUBLICATIONS

ETSI TS 138 331, "5G: NR; Radio Resource Control (RRC); Protocol specification", 3GPP TS 38.331 version 16.1.0 Release 16, (Jul. 2020), 886 pages, (part 2, pp. 297-591).

ETSI TS 138 331, "5G: NR; Radio Resource Control (RRC); Protocol specification", 3GPP TS 38.331 version 16.1.0 Release 16, (Jul. 2020), 886 pages, (part 3, pp. 592-886).

ETSI TS 138 300, "5G: NR; Overall description; Stage-2", 3GPP TS 38.300 version 15.8.0 Release 15, (Jan. 2020), 102 pages, (part 1, pp. 1-50).

ETSI TS 138 300, "5G: NR; Overall description; Stage-2", 3GPP TS 38.300 version 15.8.0 Release 15, (Jan. 2020), 102 pages, (part 1, pp. 51-102).

\* cited by examiner

| Transport channel / Logical channel | BCH | PCH | DL-SCH |
|---|---|---|---|
| BCCH | X | | X |
| PCCH | | X | |
| CCCH | | | X |
| DCCH | | | X |
| DTCH | | | X |

FIG. 3A

| Transport channel / Logical channel | UL-SCH | RACH |
|---|---|---|
| CCCH | X | |
| DCCH | X | |
| DTCH | X | |

FIG. 3B

| Transport channel / Logical channel | SL-BCH | SL-SCH |
|---|---|---|
| SBCCH | X | |
| SCCH | | X |
| STCH | | X |

FIG. 3C

| Physical channel / Transport channel | PDSCH | PDCCH | PBCH |
|---|---|---|---|
| BCH | | | X |
| PCH | X | | |
| DL-SCH | X | | |

FIG. 4A

| Physical channel / Transport channel | PUSCH | PUCCH | PRACH |
|---|---|---|---|
| UL-SCH | X | | |
| RACH | | | X |

FIG. 4B

| Physical channel / Transport channel | PSSCH | PSCCH | PSFCH | PSBCH |
|---|---|---|---|---|
| SL-BCH | | | | X |
| SL-SCH | X | | | |

FIG. 4C

| Physical Signal | DM-RS | PT-RS | PRS | CSI-RS | PSS | SSS | SRS | S-PSS | S-SSS |
|---|---|---|---|---|---|---|---|---|---|
| DL | X | X | X | X | X | X | | | |
| UL | X | X | | | | | X | | |
| SL | X | X | | X | | | | X | X |

FIG. 6

HANDOVER PROCEDURES INVOLVING SIDELINK COMMUNICATIONS

CROSS-REFERENCE TO RELATED APPLICATION

This application is a continuation of U.S. patent application Ser. No. 17/456,826, filed Nov. 29, 2021, which claims the benefit of U.S. Provisional Application No. 63/119,700, entitled "HANDOVER PROCEDURES INVOLVING SIDELINK COMMUNICATIONS", and filed on Dec. 1, 2020. U.S. Provisional Application No. 63/119,700 and U.S. patent application Ser. No. 17/456,826 are incorporated by reference herein.

BACKGROUND

Generally described, computing devices and communication networks can be utilized to exchange information. In a common application, a computing device can request/transmit data with another computing device via the communication network. More specifically, computing devices may utilize a wireless communication network to exchange information or establish communication channels.

Wireless communication networks can include a wide variety of devices that include or access components to access a wireless communication network. Such devices can utilize the wireless communication network to facilitate interactions with other devices that can access the wireless communication network or to facilitate interaction, through the wireless communication network, with devices utilizing other communication networks.

BRIEF DESCRIPTION OF THE DRAWINGS

FIG. 3A, FIG. 3B and FIG. 3C show example mappings between logical channels and transport channels in downlink, uplink and sidelink, respectively, according to some aspects of some of various exemplary embodiments of the present disclosure.

FIG. 4A, FIG. 4B and FIG. 4C show example mappings between transport channels and physical channels in downlink, uplink and sidelink, respectively, according to some aspects of some of various exemplary embodiments of the present disclosure.

FIG. 6 shows example physical signals in downlink, uplink and sidelink according to some aspects of some of various exemplary embodiments of the present disclosure.

DETAILED DESCRIPTION

Figure 1:
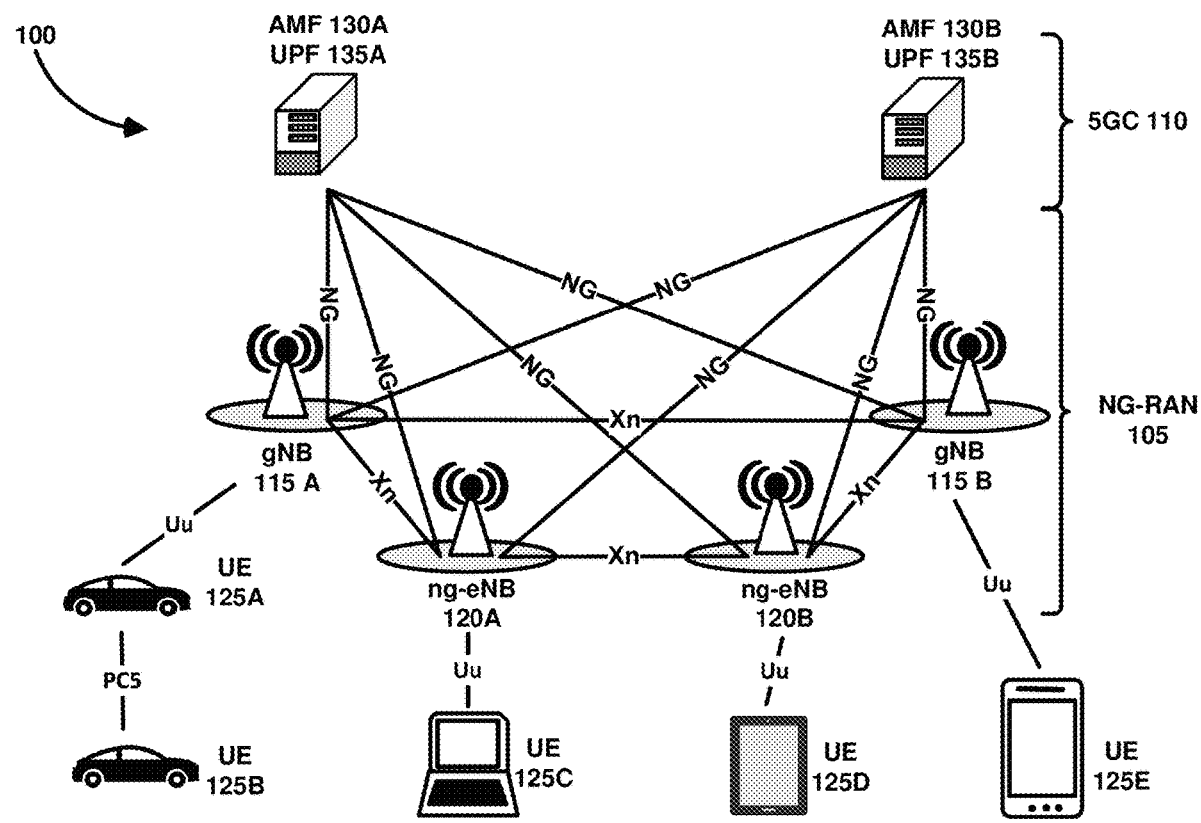
FIG. 1 shows an example of a system of mobile communications according to some aspects of some of various exemplary embodiments of the present disclosure.

FIG. 1 shows an example of a system of mobile communications 100 according to some aspects of some of various exemplary embodiments of the present disclosure. The system of mobile communication 100 may be operated by a wireless communications system operator such as a Mobile Network Operator (MNO), a private network operator, a Multiple System Operator (MSO), an Internet of Things (IoT) network operator, etc., and may offer services such as voice, data (e.g., wireless Internet access), messaging, vehicular communications services such as Vehicle to Everything (V2X) communications services, safety services, mission critical service, services in residential, commercial or industrial settings such as IoT, industrial IoT (IIOT), etc.

The system of mobile communications 100 may enable various types of applications with different requirements in terms of latency, reliability, throughput, etc. Example supported applications include enhanced Mobile Broadband (eMBB), Ultra-Reliable Low-Latency Communications (URLLC), and massive Machine Type Communications (mMTC). eMBB may support stable connections with high peak data rates, as well as moderate rates for cell-edge users. URLLC may support application with strict requirements in terms of latency and reliability and moderate requirements in terms of data rate. Example mMTC application includes a network of a massive number of IoT devices, which are only sporadically active and send small data payloads.

The system of mobile communications 100 may include a Radio Access Network (RAN) portion and a core network portion. The example shown in FIG. 1 illustrates a Next Generation RAN (NG-RAN) 105 and a 5G Core Network (5GC) 110 as examples of the RAN and core network, respectively. Other examples of RAN and core network may be implemented without departing from the scope of this disclosure. Other examples of RAN include Evolved Universal Terrestrial Radio Access Network (EUTRAN), Universal Terrestrial Radio Access Network (UTRAN), etc. Other examples of core network include Evolved Packet Core (EPC), UMTS Core Network (UCN), etc. The RAN implements a Radio Access Technology (RAT) and resides between User Equipments (UEs) 125 and the core network. Examples of such RATs include New Radio (NR), Long Term Evolution (LTE) also known as Evolved Universal Terrestrial Radio Access (EUTRA), Universal Mobile Telecommunication System (UMTS), etc. The RAT of the example system of mobile communications 100 may be NR. The core network resides between the RAN and one or more external networks (e.g., data networks) and is responsible for functions such as mobility management, authentication, session management, setting up bearers and application of different Quality of Services (QoSs). The functional layer between the UE 125 and the RAN (e.g., the NG-RAN 105) may be referred to as Access Stratum (AS) and the functional layer between the UE 125 and the core network (e.g., the 5GC 110) may be referred to as Non-access Stratum (NAS).

The UEs 125 may include wireless transmission and reception components for communications with one or more nodes in the RAN, one or more relay nodes, or one or more other UEs, etc. Example of UEs include, but are not limited to, smartphones, tablets, laptops, computers, wireless transmission and/or reception units in a vehicle, V2X or Vehicle to Vehicle (V2V) devices, wireless sensors, IoT devices, HOT devices, etc. Other names may be used for UEs such as a Mobile Station (MS), terminal equipment, terminal node, client device, mobile device, etc. Illustratively, a communication network may be characterized as a set of geographic areas, referred to as cells, which may be logically organized in a contingent manner. The cells are organized in a manner such that individual cells may be associated with one or more base stations that establish wireless communications with a plurality of UEs. The base stations may be physically located within an individual cell such that wireless radio signals transmitted from the cell may be received by UEs also physically within the cell. In other embodiments, base stations may be located outside of the physical cell may be configured to transmit wireless signals to UEs within the cell. In some embodiments, individual UEs may be able to receive signals transmitted between adjacent cells due to overlapping signal coverage. In accordance, reference to communications from a target cell or existing cell can refer to connections between one or more base stations attributed to the cell and a UE 125.

The RAN may include nodes (e.g., base stations) for communications with the UEs. For example, the NG-RAN 105 of the system of mobile communications 100 may comprise nodes for communications with the UEs 125. Different names for the RAN nodes may be used, for example depending on the RAT used for the RAN. A RAN node may be referred to as Node B (NB) in a RAN that uses the UMTS RAT. A RAN node may be referred to as an evolved Node B (eNB) in a RAN that uses LTE/EUTRA RAT. For the illustrative example of the system of mobile communications 100 in FIG. 1, the nodes of an NG-RAN 105 may be either a next generation Node B (gNB) 115 or a next generation evolved Node B (ng-eNB) 120. In this specification, the terms base station, RAN node, gNB and ng-eNB may be used interchangeably. Illustratively, a communication network may be characterized as a set of geographic areas, referred to as cells, which may be logically organized in a contingent manner. The cells are organized in a manner such that individual cells may be associated with one or more base stations that establish wireless communications with a plurality of UEs. The base stations may be physically located within an individual cell such that wireless radio signals transmitted from the cell may be received by UEs also physically within the cell. In other embodiments, base stations may be located outside of the physical cell may be configured to transmit wireless signals to UEs within the cell. In some embodiments, individual UEs may be able to receive signals transmitted between adjacent cells due to overlapping signal coverage. In accordance, reference to communications from a target cell or existing cell can refer to connections between one or more base stations attributed to the cell and a UE 125.

The gNB 115 may provide NR user plane and control plane protocol terminations towards the UE 125. The ng-eNB 120 may provide E-UTRA user plane and control plane protocol terminations towards the UE 125. An interface between the gNB 115 and the UE 125 or between the ng-eNB 120 and the UE 125 may be referred to as a Uu interface. The Uu interface may be established with a user plane protocol stack and a control plane protocol stack. For a Uu interface, the direction from the base station (e.g., the gNB 115 or the ng-eNB 120) to the UE 125 may be referred to as downlink and the direction from the UE 125 to the base station (e.g., gNB 115 or ng-eNB 120) may be referred to as uplink.

The gNBs 115 and ng-eNBs 120 may be interconnected with each other by means of an Xn interface. The Xn interface may comprise an Xn User plane (Xn-U) interface and an Xn Control plane (Xn-C) interface. The transport network layer of the Xn-U interface may be built on Internet Protocol (IP) transport and GPRS Tunneling Protocol (GTP) may be used on top of User Datagram Protocol (UDP)/IP to carry the user plane protocol data units (PDUs). Xn-U may provide non-guaranteed delivery of user plane PDUs and may support data forwarding and flow control. The transport network layer of the Xn-C interface may be built on Stream Control Transport Protocol (SCTP) on top of IP. The application layer signaling protocol may be referred to as XnAP (Xn Application Protocol). The SCTP layer may provide the guaranteed delivery of application layer messages. In the transport IP layer, point-to-point transmission may be used to deliver the signaling PDUs. The Xn-C interface may support Xn interface management, UE mobility management, including context transfer and RAN paging, and dual connectivity.

The gNBs 115 and ng-eNBs 120 may also be connected to the 5GC 110 by means of the NG interfaces, more specifically to an Access and Mobility Management Function (AMF) 130 of the 5GC 110 by means of the NG-C interface and to a User Plane Function (UPF) 135 of the 5GC 110 by means of the NG-U interface. The transport network layer of the NG-U interface may be built on IP transport and GTP protocol may be used on top of UDP/IP to carry the user plane PDUs between the NG-RAN node (e.g., gNB 115 or ng-eNB 120) and the UPF 135. NG-U may provide non-guaranteed delivery of user plane PDUs between the NG-RAN node and the UPF. The transport network layer of the NG-C interface may be built on IP transport. For the reliable transport of signaling messages, SCTP may be added on top of IP. The application layer signaling protocol may be referred to as NGAP (NG Application Protocol). The SCTP layer may provide guaranteed delivery of application layer messages. In the transport, IP layer point-to-point transmission may be used to deliver the signaling PDUs. The NG-C interface may provide the following functions: NG interface management; UE context management; UE mobility management; transport of NAS messages; paging; PDU Session Management; configuration transfer; and warning message transmission.

The gNB 115 or the ng-eNB 120 may host one or more of the following functions: Radio Resource Management functions such as Radio Bearer Control, Radio Admission Control, Connection Mobility Control, Dynamic allocation of resources to UEs in both uplink and downlink (e.g., scheduling); IP and Ethernet header compression, encryption and integrity protection of data; Selection of an AMF at UE attachment when no routing to an AMF can be determined from the information provided by the UE; Routing of User Plane data towards UPF(s); Routing of Control Plane information towards AMF; Connection setup and release; Scheduling and transmission of paging messages; Scheduling and transmission of system broadcast information (e.g., originated from the AMF); Measurement and measurement reporting configuration for mobility and scheduling; Transport level packet marking in the uplink; Session Management; Support of Network Slicing; QoS Flow management and mapping to data radio bearers; Support of UEs in RRC Inactive state; Distribution function for NAS messages; Radio access network sharing; Dual Connectivity; Tight interworking between NR and E-UTRA; and Maintaining security and radio configuration for User Plane 5G system (5GS) Cellular IoT (CIoT) Optimization.

The AMF 130 may host one or more of the following functions: NAS signaling termination; NAS signaling security; AS Security control; Inter CN node signaling for mobility between 3GPP access networks; Idle mode UE Reachability (including control and execution of paging retransmission); Registration Area management; Support of intra-system and inter-system mobility; Access Authentication; Access Authorization including check of roaming rights; Mobility management control (subscription and policies); Support of Network Slicing; Session Management Function (SMF) selection; Selection of 5GS CIoT optimizations.

The UPF 135 may host one or more of the following functions: Anchor point for Intra-/Inter-RAT mobility (when applicable); External PDU session point of interconnect to Data Network; Packet routing & forwarding; Packet inspection and User plane part of Policy rule enforcement; Traffic usage reporting; Uplink classifier to support routing traffic flows to a data network; Branching point to support multi-homed PDU session; QoS handling for user plane, e.g. packet filtering, gating, UL/DL rate enforcement; Uplink Traffic verification (Service Data Flow (SDF) to QoS flow mapping); Downlink packet buffering and downlink data notification triggering.

As shown in FIG. 1, the NG-RAN 105 may support the PC5 interface between two UEs 125 (e.g., UE 125A and UE125B). In the PC5 interface, the direction of communications between two UEs (e.g., from UE 125A to UE 125B or vice versa) may be referred to as sidelink. Sidelink transmission and reception over the PC5 interface may be supported when the UE 125 is inside NG-RAN 105 coverage, irrespective of which RRC state the UE is in, and when the UE 125 is outside NG-RAN 105 coverage. Support of V2X services via the PC5 interface may be provided by NR sidelink communication and/or V2X sidelink communication.

PC5-S signaling may be used for unicast link establishment with Direct Communication Request/Accept message. A UE may self-assign its source Layer-2 ID for the PC5 unicast link for example based on the V2X service type. During unicast link establishment procedure, the UE may send its source Layer-2 ID for the PC5 unicast link to the peer UE, e.g., the UE for which a destination ID has been received from the upper layers. A pair of source Layer-2 ID and destination Layer-2 ID may uniquely identify a unicast link. The receiving UE may verify that the said destination ID belongs to it and may accept the Unicast link establishment request from the source UE. During the PC5 unicast link establishment procedure, a PC5-RRC procedure on the Access Stratum may be invoked for the purpose of UE sidelink context establishment as well as for AS layer configurations, capability exchange etc. PC5-RRC signaling may enable exchanging UE capabilities and AS layer configurations such as Sidelink Radio Bearer configurations between pair of UEs for which a PC5 unicast link is established.

NR sidelink communication may support one of three types of transmission modes (e.g., Unicast transmission, Groupcast transmission, and Broadcast transmission) for a pair of a Source Layer-2 ID and a Destination Layer-2 ID in the AS. The Unicast transmission mode may be characterized by: Support of one PC5-RRC connection between peer UEs for the pair; Transmission and reception of control information and user traffic between peer UEs in sidelink; Support of sidelink HARQ feedback; Support of sidelink transmit power control; Support of RLC Acknowledged Mode (AM); and Detection of radio link failure for the PC5-RRC connection. The Groupcast transmission may be characterized by: Transmission and reception of user traffic among UEs belonging to a group in sidelink; and Support of sidelink HARQ feedback. The Broadcast transmission may be characterized by: Transmission and reception of user traffic among UEs in sidelink.

A Source Layer-2 ID, a Destination Layer-2 ID and a PC5 Link Identifier may be used for NR sidelink communication. The Source Layer-2 ID may be a link-layer identity that identifies a device or a group of devices that are recipients of sidelink communication frames. The Destination Layer-2 ID may be a link-layer identity that identifies a device that originates sidelink communication frames. In some examples, the Source Layer-2 ID and the Destination Layer-2 ID may be assigned by a management function in the Core Network. The Source Layer-2 ID may identify the sender of the data in NR sidelink communication. The Source Layer-2 ID may be 24 bits long and may be split in the MAC layer into two bit strings: One bit string may be the LSB part (8 bits) of Source Layer-2 ID and forwarded to physical layer of the sender. This may identify the source of the intended data in sidelink control information and may be used for filtering of packets at the physical layer of the receiver; and the Second bit string may be the MSB part (16 bits) of the Source Layer-2 ID and may be carried within the Medium Access Control (MAC) header. This may be used for filtering of packets at the MAC layer of the receiver. The Destination Layer-2 ID may identify the target of the data in NR sidelink communication. For NR sidelink communication, the Destination Layer-2 ID may be 24 bits long and may be split in the MAC layer into two bit strings: One bit string may be the LSB part (16 bits) of Destination Layer-2 ID and forwarded to physical layer of the sender. This may identify the target of the intended data in sidelink control information and may be used for filtering of packets at the physical layer of the receiver; and the Second bit string may be the MSB part (8 bits) of the Destination Layer-2 ID and may be carried within the MAC header. This may be used for filtering of packets at the MAC layer of the receiver. The PC5 Link Identifier may uniquely identify the PC5 unicast link in a UE for the lifetime of the PC5 unicast link. The PC5 Link Identifier may be used to indicate the PC5 unicast link whose sidelink Radio Link failure (RLF) declaration was made and PC5-RRC connection was released.

Figure 2A:
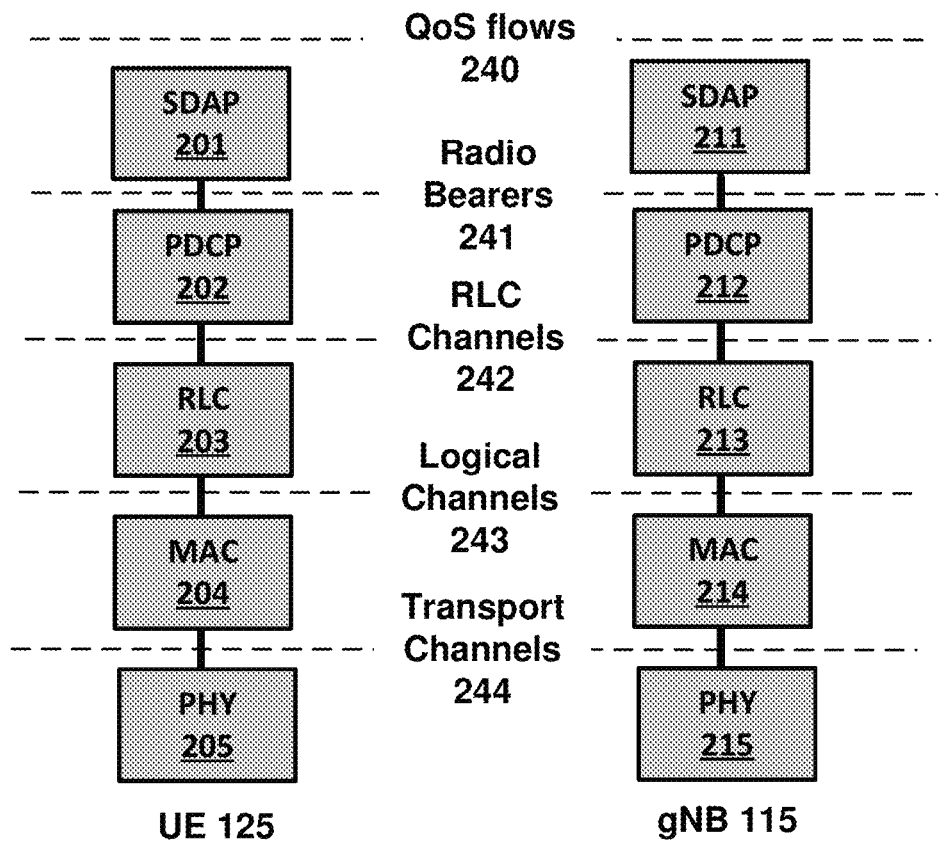
FIG. 2A and FIG. 2B show examples of radio protocol stacks for user plane and control plane, respectively, according to some aspects of some of various exemplary embodiments of the present disclosure.
Figure 2B:
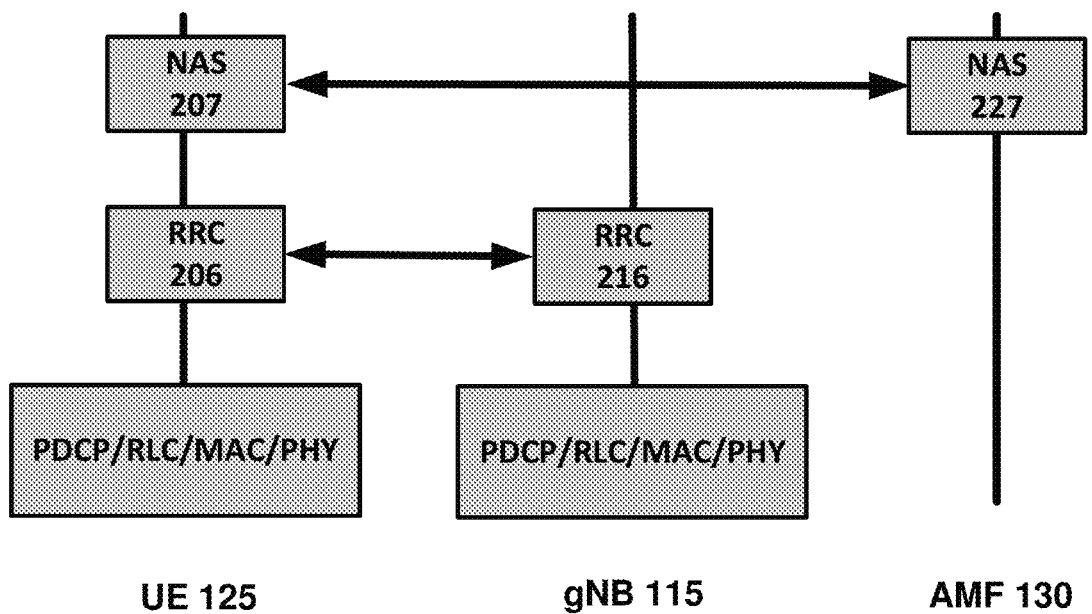

FIG. 2A and FIG. 2B show examples of radio protocol stacks for user plane and control plane, respectively, according to some aspects of some of various exemplary embodiments of the present disclosure. As shown in FIG. 2A, the protocol stack for the user plane of the Uu interface (between the UE 125 and the gNB 115) includes Service Data Adaptation Protocol (SDAP) 201 and SDAP 211, Packet Data Convergence Protocol (PDCP) 202 and PDCP 212, Radio Link Control (RLC) 203 and RLC 213, MAC 204 and MAC 214 sublayers of layer 2 and Physical (PHY) 205 and PHY 215 layer (layer 1 also referred to as L1).

The PHY 205 and PHY 215 offer transport channels 244 to the MAC 204 and MAC 214 sublayer. The MAC 204 and MAC 214 sublayer offer logical channels 243 to the RLC 203 and RLC 213 sublayer. The RLC 203 and RLC 213 sublayer offer RLC channels 242 to the PDCP 202 and PCP 212 sublayer. The PDCP 202 and PDCP 212 sublayer offer radio bearers 241 to the SDAP 201 and SDAP 211 sublayer. Radio bearers may be categorized into two groups: Data Radio Bearers (DRBs) for user plane data and Signaling Radio Bearers (SRBs) for control plane data. The SDAP 201 and SDAP 211 sublayer offers QoS flows 240 to 5GC.

The main services and functions of the MAC 204 or MAC 214 sublayer include: mapping between logical channels and transport channels; Multiplexing/demultiplexing of MAC Service Data Units (SDUs) belonging to one or different logical channels into/from Transport Blocks (TB) delivered to/from the physical layer on transport channels; Scheduling information reporting; Error correction through Hybrid Automatic Repeat Request (HARQ) (one HARQ entity per cell in case of carrier aggregation (CA)); Priority handling between UEs by means of dynamic scheduling; Priority handling between logical channels of one UE by means of Logical Channel Prioritization (LCP); Priority handling between overlapping resources of one UE; and Padding. A single MAC entity may support multiple numerologies, transmission timings and cells. Mapping restrictions in logical channel prioritization control which numerology(ies), cell(s), and transmission timing(s) a logical channel may use.

The HARQ functionality may ensure delivery between peer entities at Layer 1. A single HARQ process may support one TB when the physical layer is not configured for downlink/uplink spatial multiplexing, and when the physical layer is configured for downlink/uplink spatial multiplexing, a single HARQ process may support one or multiple TBs.

The RLC 203 or RLC 213 sublayer may support three transmission modes: Transparent Mode (TM); Unacknowledged Mode (UM); and Acknowledged Mode (AM). The RLC configuration may be per logical channel with no dependency on numerologies and/or transmission durations, and Automatic Repeat Request (ARQ) may operate on any of the numerologies and/or transmission durations the logical channel is configured with.

The main services and functions of the RLC 203 or RLC 213 sublayer depend on the transmission mode (e.g., TM, UM or AM) and may include: Transfer of upper layer PDUs; Sequence numbering independent of the one in PDCP (UM and AM); Error Correction through ARQ (AM only); Segmentation (AM and UM) and re-segmentation (AM only) of RLC SDUs; Reassembly of SDU (AM and UM); Duplicate Detection (AM only); RLC SDU discard (AM and UM); RLC re-establishment; and Protocol error detection (AM only).

The automatic repeat request within the RLC 203 or RLC 213 sublayer may have the following characteristics: ARQ retransmits RLC SDUs or RLC SDU segments based on RLC status reports; Polling for RLC status report may be used when needed by RLC; RLC receiver may also trigger RLC status report after detecting a missing RLC SDU or RLC SDU segment.

The main services and functions of the PDCP 202 or PDCP 212 sublayer may include: Transfer of data (user plane or control plane); Maintenance of PDCP Sequence Numbers (SNs); Header compression and decompression using the Robust Header Compression (ROHC) protocol; Header compression and decompression using EHC protocol; Ciphering and deciphering; Integrity protection and integrity verification; Timer based SDU discard; Routing for split bearers; Duplication; Reordering and in-order delivery; Out-of-order delivery; and Duplicate discarding.

The main services and functions of SDAP 201 or SDAP 211 include: Mapping between a QoS flow and a data radio bearer, and Marking QoS Flow ID (QFI) in both downlink and uplink packets. A single protocol entity of SDAP may be configured for each individual PDU session.

As shown in FIG. 2B, the protocol stack of the control plane of the Uu interface (between the UE 125 and the gNB 115) includes PHY layer (layer 1), and MAC, RLC and PDCP sublayers of layer 2 as described above and in addition, the RRC 206 sublayer and RRC 216 sublayer. The main services and functions of the RRC 206 sublayer and the RRC 216 sublayer over the Uu interface include: Broadcast of System Information related to AS and NAS; Paging initiated by 5GC or NG-RAN; Establishment, maintenance and release of an RRC connection between the UE and NG-RAN (including Addition, modification and release of carrier aggregation; and Addition, modification and release of Dual Connectivity in NR or between E-UTRA and NR); Security functions including key management; Establishment, configuration, maintenance and release of SRBs and DRBs; Mobility functions (including Handover and context transfer; UE cell selection and reselection and control of cell selection and reselection; and Inter-RAT mobility); QoS management functions; UE measurement reporting and control of the reporting; Detection of and recovery from radio link failure; and NAS message transfer to/from NAS from/to UE. The NAS 207 and NAS 227 layer is a control protocol (terminated in AMF on the network side) that performs the functions such as authentication, mobility management, security control, etc.

The sidelink specific services and functions of the RRC sublayer over the Uu interface include: Configuration of sidelink resource allocation via system information or dedicated signaling; Reporting of UE sidelink information; Measurement configuration and reporting related to sidelink; and Reporting of UE assistance information for SL traffic pattern(s).

FIG. 3A, FIG. 3B and FIG. 3C show example mappings between logical channels and transport channels in downlink, uplink and sidelink, respectively, according to some aspects of some of various exemplary embodiments of the present disclosure. Different kinds of data transfer services may be offered by MAC. Each logical channel type may be defined by what type of information is transferred. Logical channels may be classified into two groups: Control Channels and Traffic Channels. Control channels may be used for the transfer of control plane information only. The Broadcast Control Channel (BCCH) is a downlink channel for broadcasting system control information. The Paging Control Channel (PCCH) is a downlink channel that carries paging messages. The Common Control Channel (CCCH) is channel for transmitting control information between UEs and network. This channel may be used for UEs having no RRC connection with the network. The Dedicated Control Channel (DCCH) is a point-to-point bi-directional channel that transmits dedicated control information between a UE and the network and may be used by UEs having an RRC connection. Traffic channels may be used for the transfer of user plane information only. The Dedicated Traffic Channel (DTCH) is a point-to-point channel, dedicated to one UE, for the transfer of user information. A DTCH may exist in both uplink and downlink. Sidelink Control Channel (SCCH) is a sidelink channel for transmitting control information (e.g., PC5-RRC and PC5-S messages) from one UE to other UE(s). Sidelink Traffic Channel (STCH) is a sidelink channel for transmitting user information from one UE to other UE(s). Sidelink Broadcast Control Channel (SBCCH) is a sidelink channel for broadcasting sidelink system information from one UE to other UE(s).

The downlink transport channel types include Broadcast Channel (BCH), Downlink Shared Channel (DL-SCH), and Paging Channel (PCH). The BCH may be characterized by: fixed, pre-defined transport format; and requirement to be broadcast in the entire coverage area of the cell, either as a single message or by beamforming different BCH instances. The DL-SCH may be characterized by: support for HARQ; support for dynamic link adaptation by varying the modulation, coding and transmit power; possibility to be broadcast in the entire cell; possibility to use beamforming; support for both dynamic and semi-static resource allocation; and the support for UE Discontinuous Reception (DRX) to enable UE power saving. The DL-SCH may be characterized by: support for HARQ; support for dynamic link adaptation by varying the modulation, coding and transmit power; possibility to be broadcast in the entire cell; possibility to use beamforming; support for both dynamic and semi-static resource allocation; support for UE discontinuous reception (DRX) to enable UE power saving. The PCH may be characterized by: support for UE discontinuous reception (DRX) to enable UE power saving (DRX cycle is indicated by the network to the UE); requirement to be broadcast in the entire coverage area of the cell, either as a single message or by beamforming different BCH instances; mapped to physical resources which can be used dynamically also for traffic/other control channels.

In downlink, the following connections between logical channels and transport channels may exist: BCCH may be mapped to BCH; BCCH may be mapped to DL-SCH; PCCH may be mapped to PCH; CCCH may be mapped to DL-SCH; DCCH may be mapped to DL-SCH; and DTCH may be mapped to DL-SCH.

The uplink transport channel types include Uplink Shared Channel (UL-SCH) and Random Access Channel(s) (RACH). The UL-SCH may be characterized by possibility to use beamforming; support for dynamic link adaptation by varying the transmit power and potentially modulation and coding; support for HARQ; support for both dynamic and semi-static resource allocation. The RACH may be characterized by limited control information; and collision risk.

In Uplink, the following connections between logical channels and transport channels may exist: CCCH may be mapped to UL-SCH; DCCH may be mapped to UL-SCH; and DTCH may be mapped to UL-SCH.

The sidelink transport channel types include: Sidelink broadcast channel (SL-BCH) and Sidelink shared channel (SL-SCH). The SL-BCH may be characterized by predefined transport format. The SL-SCH may be characterized by support for unicast transmission, groupcast transmission and broadcast transmission; support for both UE autonomous resource selection and scheduled resource allocation by NG-RAN; support for both dynamic and semi-static resource allocation when UE is allocated resources by the NG-RAN; support for HARQ; and support for dynamic link adaptation by varying the transmit power, modulation and coding.

In the sidelink, the following connections between logical channels and transport channels may exist: SCCH may be mapped to SL-SCH; STCH may be mapped to SL-SCH; and SBCCH may be mapped to SL-BCH.

FIG. 4A, FIG. 4B and FIG. 4C show example mappings between transport channels and physical channels in downlink, uplink and sidelink, respectively, according to some aspects of some of various exemplary embodiments of the present disclosure. The physical channels in downlink include Physical Downlink Shared Channel (PDSCH), Physical Downlink Control Channel (PDCCH) and Physical Broadcast Channel (PBCH). The PCH and DL-SCH transport channels are mapped to the PDSCH. The BCH transport channel is mapped to the PBCH. A transport channel is not mapped to the PDCCH but Downlink Control Information (DCI) is transmitted via the PDCCH.

The physical channels in the uplink include Physical Uplink Shared Channel (PUSCH), Physical Uplink Control Channel (PUCCH) and Physical Random Access Channel (PRACH). The UL-SCH transport channel may be mapped to the PUSCH and the RACH transport channel may be mapped to the PRACH. A transport channel is not mapped to the PUCCH but Uplink Control Information (UCI) is transmitted via the PUCCH.

The physical channels in the sidelink include Physical Sidelink Shared Channel (PSSCH), Physical Sidelink Control Channel (PSCCH), Physical Sidelink Feedback Channel (PSFCH) and Physical Sidelink Broadcast Channel (PSBCH). The Physical Sidelink Control Channel (PSCCH) may indicate resource and other transmission parameters used by a UE for PSSCH. The Physical Sidelink Shared Channel (PSSCH) may transmit the TBs of data themselves, and control information for HARQ procedures and CSI feedback triggers, etc. At least 6 OFDM symbols within a slot may be used for PSSCH transmission. Physical Sidelink Feedback Channel (PSFCH) may carry the HARQ feedback over the sidelink from a UE which is an intended recipient of a PSSCH transmission to the UE which performed the transmission. PSFCH sequence may be transmitted in one PRB repeated over two OFDM symbols near the end of the sidelink resource in a slot. The SL-SCH transport channel may be mapped to the PSSCH. The SL-BCH may be mapped to PSBCH. No transport channel is mapped to the PSFCH but Sidelink Feedback Control Information (SFCI) may be mapped to the PSFCH. No transport channel is mapped to PSCCH but Sidelink Control Information (SCI) may mapped to the PSCCH.

Figure 5A:
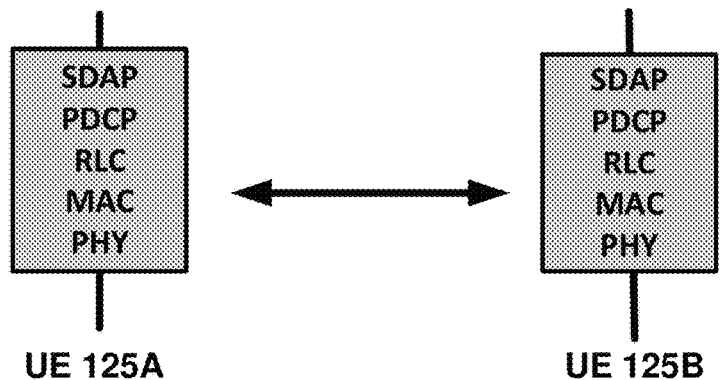
FIG. 5A, FIG. 5B, FIG. 5C and FIG. 5D show examples of radio protocol stacks for NR sidelink communication according to some aspects of some of various exemplary embodiments of the present disclosure.
Figure 5B:
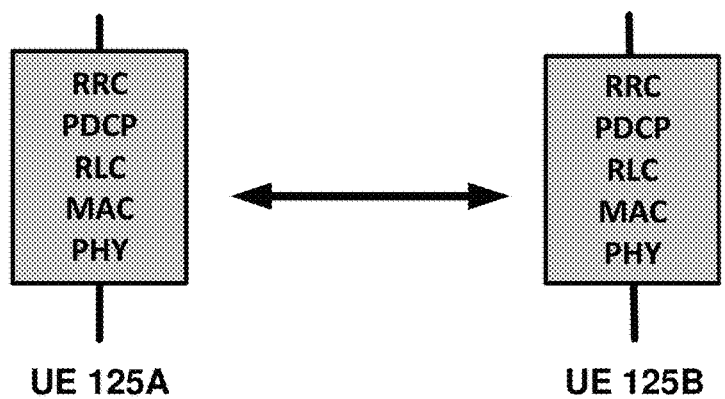
Figure 5C:
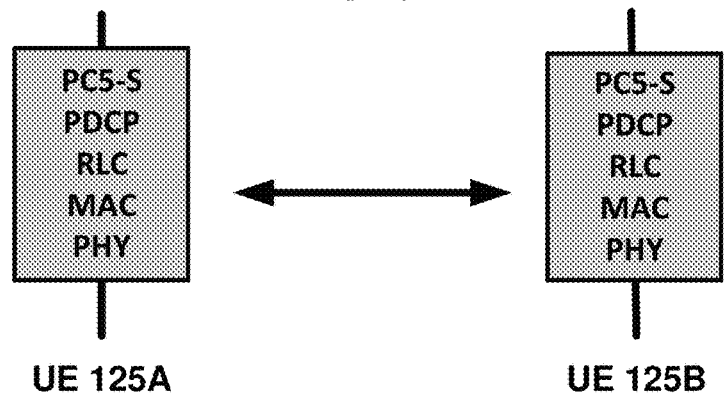
Figure 5D:
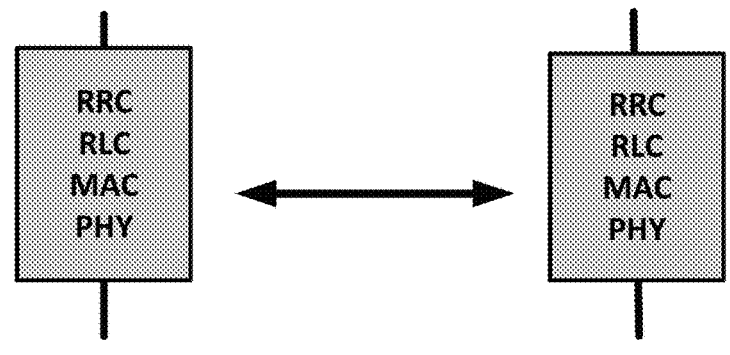

FIG. 5A, FIG. 5B, FIG. 5C and FIG. 5D show examples of radio protocol stacks for NR sidelink communication according to some aspects of some of various exemplary embodiments of the present disclosure. The AS protocol stack for user plane in the PC5 interface (i.e., for STCH) may consist of SDAP, PDCP, RLC and MAC sublayers, and the physical layer. The protocol stack of user plane is shown in FIG. 5A. The AS protocol stack for SBCCH in the PC5 interface may consist of RRC, RLC, MAC sublayers, and the physical layer as shown below in FIG. 5B. For support of PC5-S protocol, PC5-S is located on top of PDCP, RLC and MAC sublayers, and the physical layer in the control plane protocol stack for SCCH for PC5-S, as shown in FIG. 5C. The AS protocol stack for the control plane for SCCH for RRC in the PC5 interface consists of RRC, PDCP, RLC and MAC sublayers, and the physical layer. The protocol stack of control plane for SCCH for RRC is shown in FIG. 5D.

The Sidelink Radio Bearers (SLRBs) may be categorized into two groups: Sidelink Data Radio Bearers (SL DRB) for user plane data and Sidelink Signaling Radio Bearers (SL SRB) for control plane data. Separate SL SRBs using different SCCHs may be configured for PC5-RRC and PC5-S signaling, respectively.

The MAC sublayer may provide the following services and functions over the PC5 interface: Radio resource selection; Packet filtering; Priority handling between uplink and sidelink transmissions for a given UE; and Sidelink CSI reporting. With logical channel prioritization restrictions in MAC, only sidelink logical channels belonging to the same destination may be multiplexed into a MAC PDU for every unicast, groupcast and broadcast transmission which may be associated to the destination. For packet filtering, a SL-SCH MAC header including portions of both Source Layer-2 ID and a Destination Layer-2 ID may be added to a MAC PDU. The Logical Channel Identifier (LCID) included within a MAC subheader may uniquely identify a logical channel within the scope of the Source Layer-2 ID and Destination Layer-2 ID combination.

The services and functions of the RLC sublayer may be supported for sidelink. Both RLC Unacknowledged Mode (UM) and Acknowledged Mode (AM) may be used in unicast transmission while only UM may be used in groupcast or broadcast transmission. For UM, only unidirectional transmission may be supported for groupcast and broadcast.

The services and functions of the PDCP sublayer for the Uu interface may be supported for sidelink with some restrictions: Out-of-order delivery may be supported only for unicast transmission; and Duplication may not be supported over the PC5 interface.

The SDAP sublayer may provide the following service and function over the PC5 interface: Mapping between a QoS flow and a sidelink data radio bearer. There may be one SDAP entity per destination for one of unicast, groupcast and broadcast which is associated to the destination.

The RRC sublayer may provide the following services and functions over the PC5 interface: Transfer of a PC5-RRC message between peer UEs; Maintenance and release of a PC5-RRC connection between two UEs; and Detection of sidelink radio link failure for a PC5-RRC connection based on indication from MAC or RLC. A PC5-RRC connection may be a logical connection between two UEs for a pair of Source and Destination Layer-2 IDs which may be considered to be established after a corresponding PC5 unicast link is established. There may be one-to-one correspondence between the PC5-RRC connection and the PC5 unicast link. A UE may have multiple PC5-RRC connections with one or more UEs for different pairs of Source and Destination Layer-2 IDs. Separate PC5-RRC procedures and messages may be used for a UE to transfer UE capability and sidelink configuration including SL-DRB configuration to the peer UE. Both peer UEs may exchange their own UE capability and sidelink configuration using separate bi-directional procedures in both sidelink directions.

FIG. 6 shows example physical signals in downlink, uplink and sidelink according to some aspects of some of various exemplary embodiments of the present disclosure. The Demodulation Reference Signal (DM-RS) may be used in downlink, uplink and sidelink and may be used for channel estimation. DM-RS is a UE-specific reference signal and may be transmitted together with a physical channel in downlink, uplink or sidelink and may be used for channel estimation and coherent detection of the physical channel. The Phase Tracking Reference Signal (PT-RS) may be used in downlink, uplink and sidelink and may be used for tracking the phase and mitigating the performance loss due to phase noise. The PT-RS may be used mainly to estimate and minimize the effect of Common Phase Error (CPE) on system performance. Due to the phase noise properties, PT-RS signal may have a low density in the frequency domain and a high density in the time domain. PT-RS may occur in combination with DM-RS and when the network has configured PT-RS to be present. The Positioning Reference Signal (PRS) may be used in downlink for positioning using different positioning techniques. PRS may be used to measure the delays of the downlink transmissions by correlating the received signal from the base station with a local replica in the receiver. The Channel State Information Reference Signal (CSI-RS) may be used in downlink and sidelink. CSI-RS may be used for channel state estimation, Reference Signal Received Power (RSRP) measurement for mobility and beam management, time/frequency tracking for demodulation among other uses. CSI-RS may be configured UE-specifically but multiple users may share the same CSI-RS resource. The UE may determine CSI reports and transit them in the uplink to the base station using PUCCH or PUSCH. The CSI report may be carried in a sidelink MAC CE. The Primary Synchronization Signal (PSS) and the Secondary Synchronization Signal (SSS) may be used for radio fame synchronization. The PSS and SSS may be used for the cell search procedure during the initial attach or for mobility purposes. The Sounding Reference Signal (SRS) may be used in uplink for uplink channel estimation. Similar to CSI-RS, the SRS may serve as QCL reference for other physical channels such that they can be configured and transmitted quasi-collocated with SRS. The Sidelink PSS (S-PSS) and Sidelink SSS (S-SSS) may be used in sidelink for sidelink synchronization.

Figure 7:
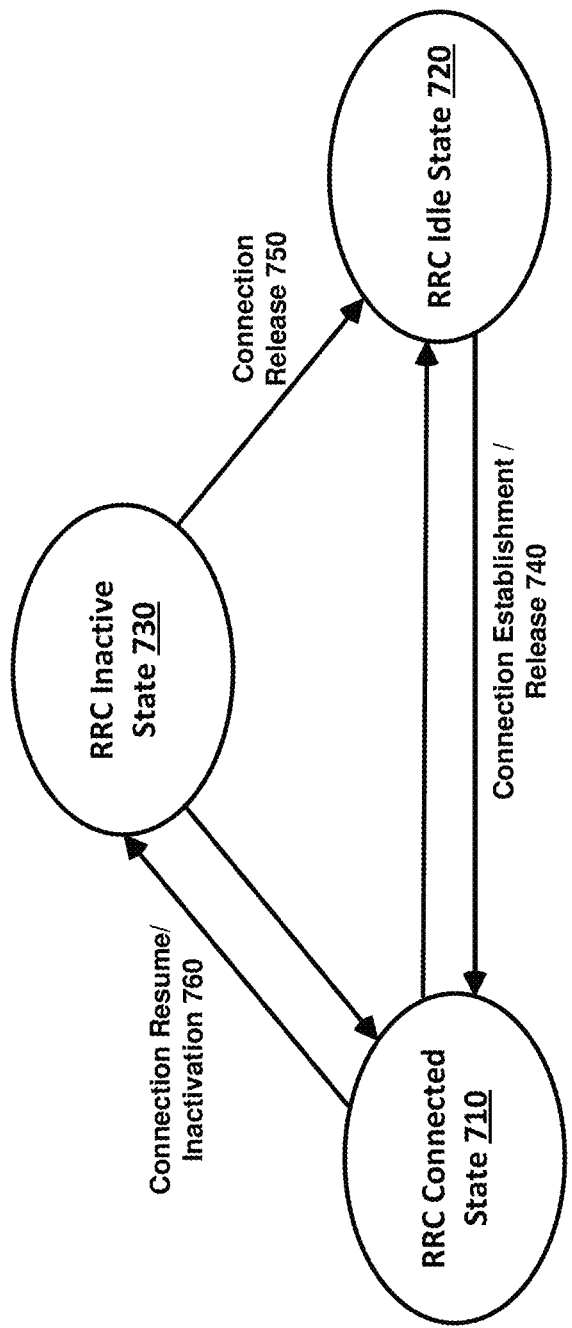
FIG. 7 shows examples of Radio Resource Control (RRC) states and transitioning between different RRC states according to some aspects of some of various exemplary embodiments of the present disclosure.

FIG. 7 shows examples of Radio Resource Control (RRC) states and transitioning between different RRC states according to some aspects of some of various exemplary embodiments of the present disclosure. A UE may be in one of three RRC states: RRC Connected State 710, RRC Idle State 720 and RRC Inactive state 730. After power up, the UE may be in RRC Idle state 720 and the UE may establish connection with the network using initial access and via an RRC connection establishment procedure to perform data transfer and/or to make/receive voice calls. Once RRC connection is established, the UE may be in RRC Connected State 710. The UE may transition from the RRC Idle state 720 to the RRC connected state 710 or from the RRC Connected State 710 to the RRC Idle state 720 using the RRC connection Establishment/Release procedures 740.

To reduce the signaling load and the latency resulting from frequent transitioning from the RRC Connected State 710 to the RRC Idle State 720 when the UE transmits frequent small data, the RRC Inactive State 730 may be used. In the RRC Inactive State 730, the AS context may be stored by both UE and gNB. This may result in faster state transition from the RRC Inactive State 730 to RRC Connected State 710. The UE may transition from the RRC Inactive State 730 to the RRC Connected State 710 or from the RRC Connected State 710 to the RRC Inactive State 730 using the RRC Connection Resume/Inactivation procedures 760. The UE may transition from the RRC Inactive State 730 to RRC Idle State 720 using an RRC Connection Release procedure 750.

Figure 8:
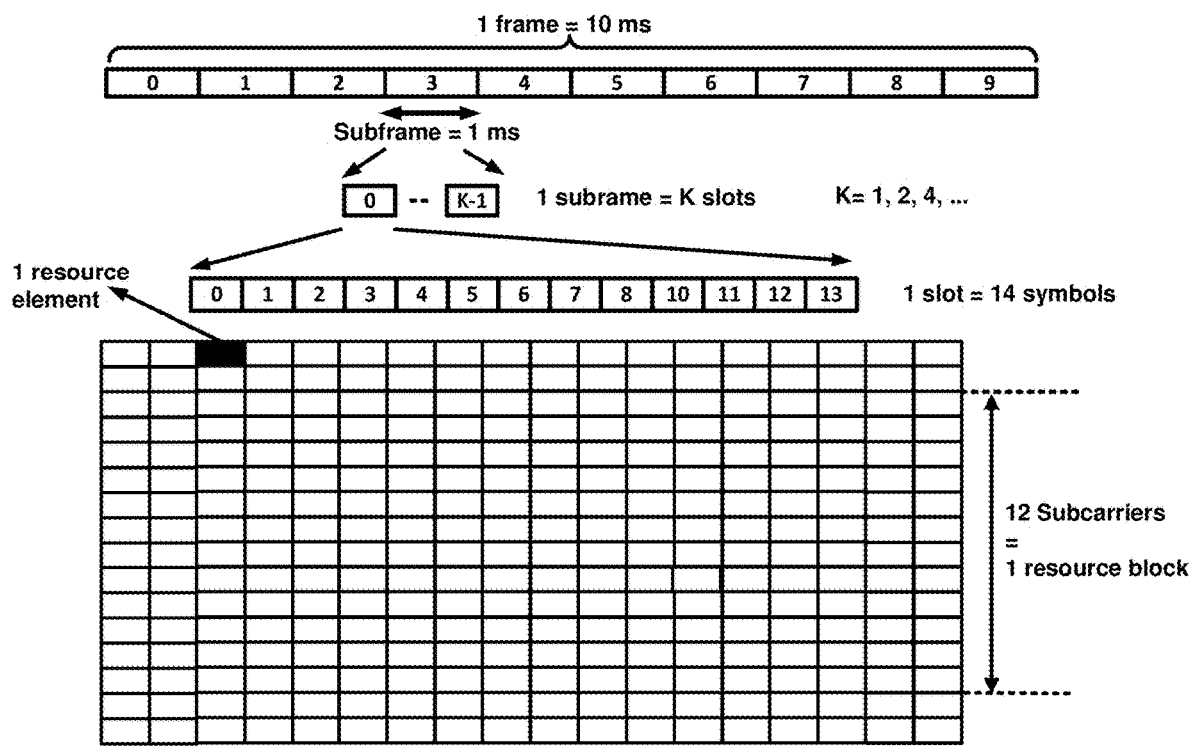
FIG. 8 shows example frame structure and physical resources according to some aspects of some of various exemplary embodiments of the present disclosure.

FIG. 8 shows example frame structure and physical resources according to some aspects of some of various exemplary embodiments of the present disclosure. The downlink or uplink or sidelink transmissions may be organized into frames with 10 ms duration, consisting of ten 1 ms subframes. Each subframe may consist of 1, 2, 4, . . . slots, wherein the number of slots per subframe may depend of the subcarrier spacing of the carrier on which the transmission takes place. The slot duration may be 14 symbols with Normal Cyclic Prefix (CP) and 12 symbols with Extended CP and may scale in time as a function of the used subcarrier spacing so that there is an integer number of slots in a subframe. FIG. 8 shows a resource grid in time and frequency domain. Each element of the resource grid, comprising one symbol in time and one subcarrier in frequency, is referred to as a Resource Element (RE). A Resource Block (RB) may be defined as 12 consecutive subcarriers in the frequency domain.

In some examples and with non-slot-based scheduling, the transmission of a packet may occur over a portion of a slot, for example during 2, 4 or 7 OFDM symbols which may also be referred to as mini-slots. The mini-slots may be used for low latency applications such as URLLC and operation in unlicensed bands. In some embodiments, the mini-slots may also be used for fast flexible scheduling of services (e.g., pre-emption of URLLC over eMBB).

Figure 9:
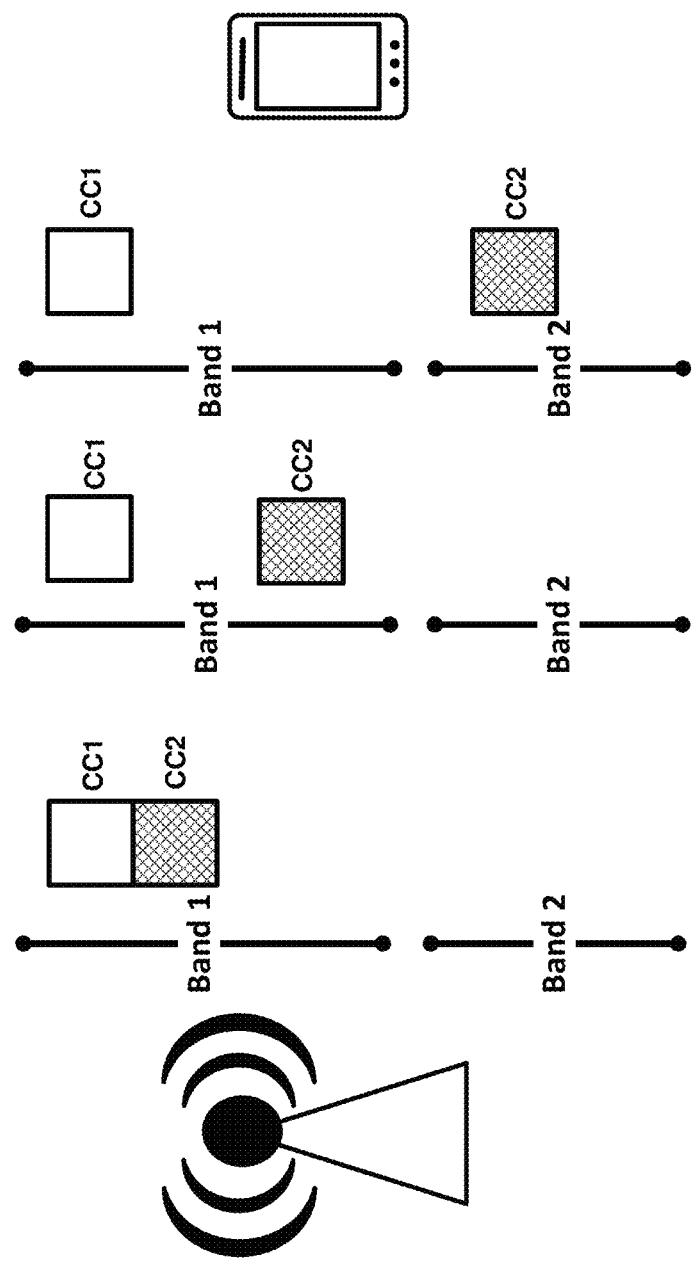
FIG. 9 shows example component carrier configurations in different carrier aggregation scenarios according to some aspects of some of various exemplary embodiments of the present disclosure.

FIG. 9 shows example component carrier configurations in different carrier aggregation scenarios according to some aspects of some of various exemplary embodiments of the present disclosure. In Carrier Aggregation (CA), two or more Component Carriers (CCs) may be aggregated. A UE may simultaneously receive or transmit on one or multiple CCs depending on its capabilities. CA may be supported for both contiguous and non-contiguous CCs in the same band or on different bands as shown in FIG. 9. A gNB and the UE may communicate using a serving cell. A serving cell may be associated at least with one downlink CC (e.g., may be associated only with one downlink CC or may be associated with a downlink CC and an uplink CC). A serving cell may be a Primary Cell (PCell) or a Secondary cCell (SCell).

A UE may adjust the timing of its uplink transmissions using an uplink timing control procedure. A Timing Advance (TA) may be used to adjust the uplink frame timing relative to the downlink frame timing. The gNB may determine the desired Timing Advance setting and provides that to the UE. The UE may use the provided TA to determine its uplink transmit timing relative to the UE's observed downlink receive timing.

In the RRC Connected state, the gNB may be responsible for maintaining the timing advance to keep the L1 synchronized. Serving cells having uplink to which the same timing advance applies and using the same timing reference cell are grouped in a Timing Advance Group (TAG). A TAG may contain at least one serving cell with configured uplink. The mapping of a serving cell to a TAG may be configured by RRC. For the primary TAG, the UE may use the PCell as timing reference cell, except with shared spectrum channel access where an SCell may also be used as timing reference cell in certain cases. In a secondary TAG, the UE may use any of the activated SCells of this TAG as a timing reference cell and may not change it unless necessary.

Timing advance updates may be signaled by the gNB to the UE via MAC CE commands. Such commands may restart a TAG-specific timer which may indicate whether the L1 can be synchronized or not: when the timer is running, the L1 may be considered synchronized, otherwise, the L1 may be considered non-synchronized (in which case uplink transmission may only take place on PRACH).

A UE with single timing advance capability for CA may simultaneously receive and/or transmit on multiple CCs corresponding to multiple serving cells sharing the same timing advance (multiple serving cells grouped in one TAG). A UE with multiple timing advance capability for CA may simultaneously receive and/or transmit on multiple CCs corresponding to multiple serving cells with different timing advances (multiple serving cells grouped in multiple TAGs). The NG-RAN may ensure that each TAG contains at least one serving cell. A non-CA capable UE may receive on a single CC and may transmit on a single CC corresponding to one serving cell only (one serving cell in one TAG).

The multi-carrier nature of the physical layer in case of CA may be exposed to the MAC layer and one HARQ entity may be required per serving cell. When CA is configured, the UE may have one RRC connection with the network. At RRC connection establishment/re-establishment/handover, one serving cell (e.g., the PCell) may provide the NAS mobility information. Depending on UE capabilities, SCells may be configured to form together with the PCell a set of serving cells. The configured set of serving cells for a UE may consist of one PCell and one or more SCells. The reconfiguration, addition and removal of SCells may be performed by RRC.

In a dual connectivity scenario, a UE may be configured with a plurality of cells comprising a Master Cell Group (MCG) for communications with a master base station, a Secondary Cell Group (SCG) for communications with a secondary base station, and two MAC entities: one MAC entity and for the MCG for communications with the master base station and one MAC entity for the SCG for communications with the secondary base station.

Figure 10:
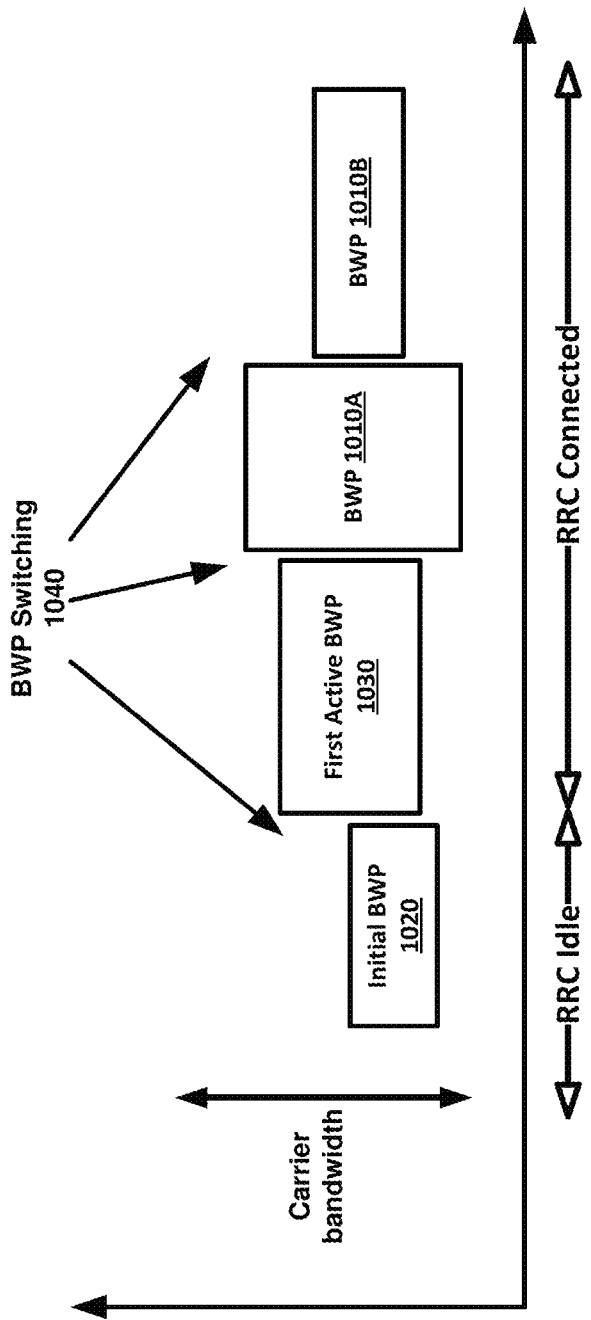
FIG. 10 shows example bandwidth part configuration and switching according to some aspects of some of various exemplary embodiments of the present disclosure.

FIG. 10 shows example bandwidth part configuration and switching according to some aspects of some of various exemplary embodiments of the present disclosure. The UE may be configured with one or more Bandwidth Parts (BWPs) 1010 on a given component carrier. In some examples, one of the one or more bandwidth parts may be active at a time. The active bandwidth part may define the UE's operating bandwidth within the cell's operating bandwidth. For initial access, and until the UE's configuration in a cell is received, initial bandwidth part 1020 determined from system information may be used. With Bandwidth Adaptation (BA), for example through BWP switching 1040, the receive and transmit bandwidth of a UE may not be as large as the bandwidth of the cell and may be adjusted. For example, the width may be ordered to change (e.g. to shrink during period of low activity to save power); the location may move in the frequency domain (e.g. to increase scheduling flexibility); and the subcarrier spacing may be ordered to change (e.g. to allow different services). The first active BWP 1020 may be the active BWP upon RRC (re-)configuration for a PCell or activation of an SCell.

For a downlink BWP or uplink BWP in a set of downlink BWPs or uplink BWPs, respectively, the UE may be provided the following configuration parameters: a Subcarrier Spacing (SCS); a cyclic prefix; a common RB and a number of contiguous RBs; an index in the set of downlink BWPs or uplink BWPs by respective BWP-Id; a set of BWP-common and a set of BWP-dedicated parameters. A BWP may be associated with an OFDM numerology according to the configured subcarrier spacing and cyclic prefix for the BWP. For a serving cell, a UE may be provided by a default downlink BWP among the configured downlink BWPs. If a UE is not provided a default downlink BWP, the default downlink BWP may be the initial downlink BWP.

A downlink BWP may be associated with a BWP inactivity timer. If the BWP inactivity timer associated with the active downlink BWP expires and if the default downlink BWP is configured, the UE may perform BWP switching to the default BWP. If the BWP inactivity timer associated with the active downlink BWP expires and if the default downlink BWP is not configured, the UE may perform BWP switching to the initial downlink BWP.

Figure 11:
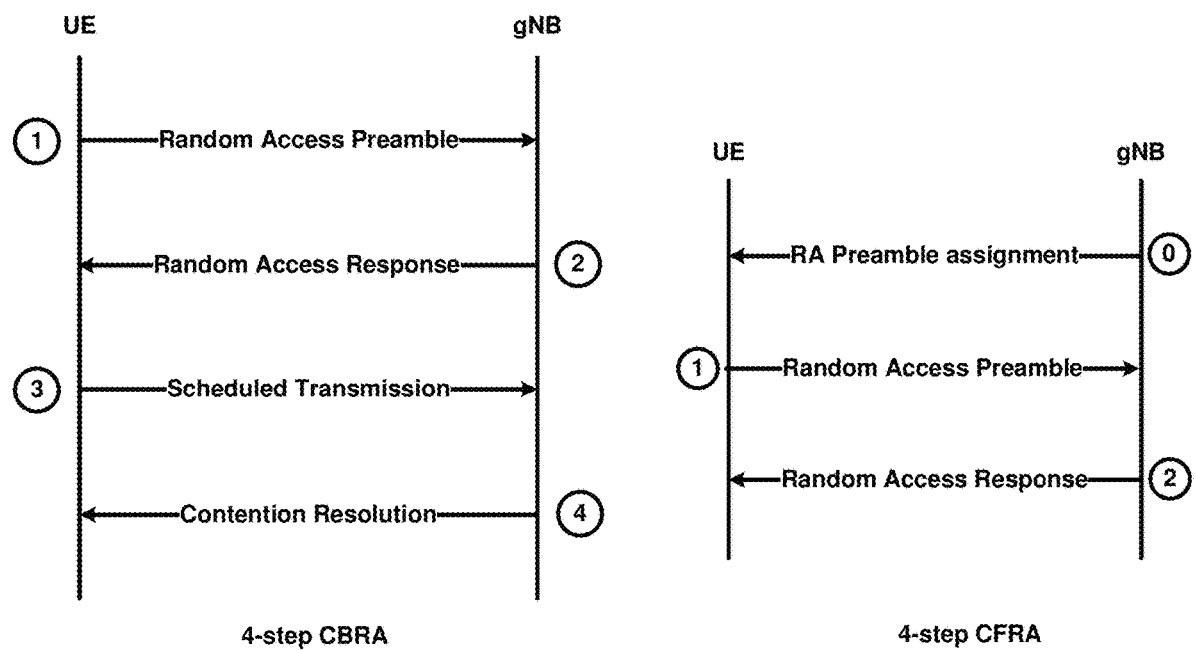
FIG. 11 shows example four-step contention-based and contention-free random access processes according to some aspects of some of various exemplary embodiments of the present disclosure.
Figure 12:
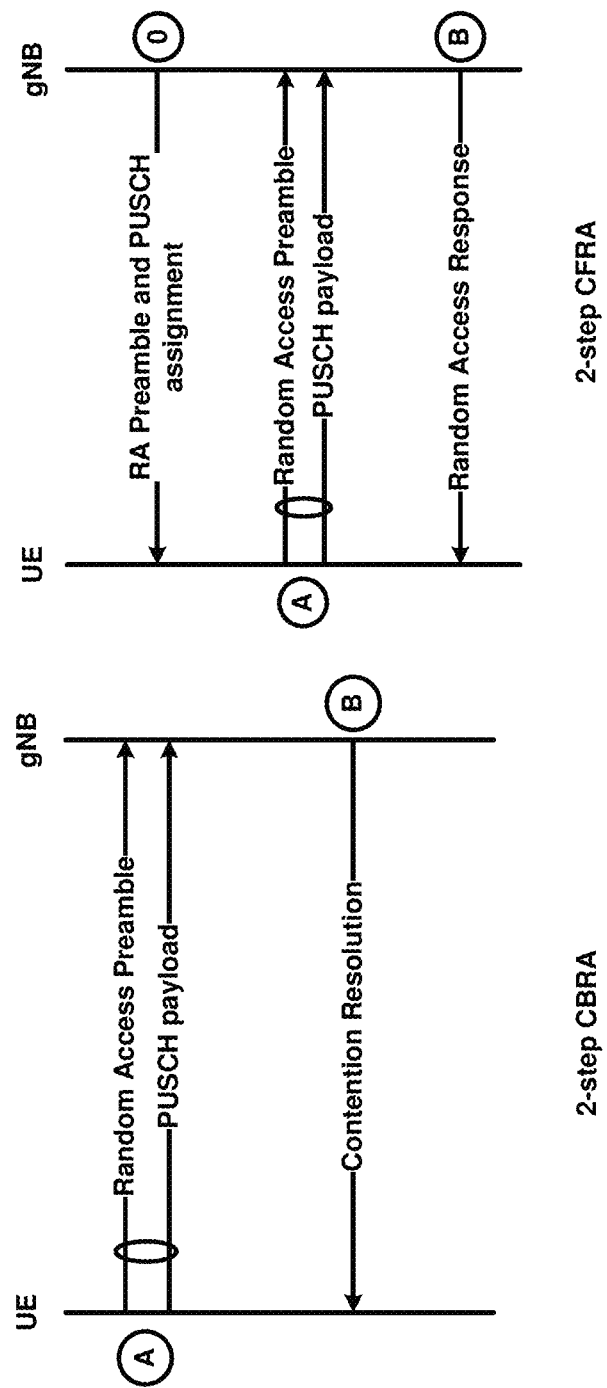
FIG. 12 shows example two-step contention-based and contention-free random access processes according to some aspects of some of various exemplary embodiments of the present disclosure.

FIG. 11 shows example four-step contention-based and contention-free random access processes according to some aspects of some of various exemplary embodiments of the present disclosure. FIG. 12 shows example two-step contention-based and contention-free random access processes according to some aspects of some of various exemplary embodiments of the present disclosure. The random access procedure may be triggered by a number of events, for example: Initial access from RRC Idle State; RRC Connection Re-establishment procedure; downlink or uplink data arrival during RRC Connected State when uplink synchronization status is "non-synchronized"; uplink data arrival during RRC Connected State when there are no PUCCH resources for Scheduling Request (SR) available; SR failure; Request by RRC upon synchronous reconfiguration (e.g. handover); Transition from RRC Inactive State; to establish time alignment for a secondary TAG; Request for Other System Information (SI); Beam Failure Recovery (BFR); Consistent uplink Listen-Before-Talk (LBT) failure on PCell.

Two types of Random Access (RA) procedure may be supported: 4-step RA type with MSG1 and 2-step RA type with MSGA. Both types of RA procedure may support Contention-Based Random Access (CBRA) and Contention-Free Random Access (CFRA) as shown in FIG. 11 and FIG. 12.

The UE may select the type of random access at initiation of the random access procedure based on network configuration. When CFRA resources are not configured, a RSRP threshold may be used by the UE to select between 2-step RA type and 4-step RA type. When CFRA resources for 4-step RA type are configured, UE may perform random access with 4-step RA type. When CFRA resources for 2-step RA type are configured, UE may perform random access with 2-step RA type.

The MSG1 of the 4-step RA type may consist of a preamble on PRACH. After MSG1 transmission, the UE may monitor for a response from the network within a configured window. For CFRA, dedicated preamble for MSG1 transmission may be assigned by the network and upon receiving Random Access Response (RAR) from the network, the UE may end the random access procedure as shown in FIG. 11. For CBRA, upon reception of the random access response, the UE may send MSG3 using the uplink grant scheduled in the random access response and may monitor contention resolution as shown in FIG. 11. If contention resolution is not successful after MSG3 (re)transmission(s), the UE may go back to MSG1 transmission.

The MSGA of the 2-step RA type may include a preamble on PRACH and a payload on PUSCH. After MSGA transmission, the UE may monitor for a response from the network within a configured window. For CFRA, dedicated preamble and PUSCH resource may be configured for MSGA transmission and upon receiving the network response, the UE may end the random access procedure as shown in FIG. 12. For CBRA, if contention resolution is successful upon receiving the network response, the UE may end the random access procedure as shown in FIG. 12; while if fallback indication is received in MSGB, the UE may perform MSG3 transmission using the uplink grant scheduled in the fallback indication and may monitor contention resolution. If contention resolution is not successful after MSG3 (re)transmission(s), the UE may go back to MSGA transmission.

Figure 13:
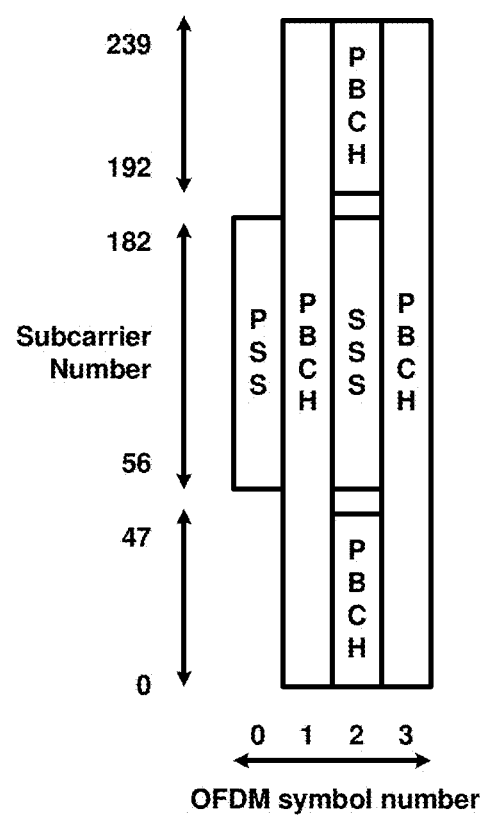
FIG. 13 shows example time and frequency structure of Synchronization Signal and Physical Broadcast Channel (PBCH) Block (SSB) according to some aspects of some of various exemplary embodiments of the present disclosure.

FIG. 13 shows example time and frequency structure of Synchronization Signal and Physical Broadcast Channel (PBCH) Block (SSB) according to some aspects of some of various exemplary embodiments of the present disclosure. The SS/PBCH Block (SSB) may consist of Primary and Secondary Synchronization Signals (PSS, SSS), each occupying 1 symbol and 127 subcarriers (e.g., subcarrier numbers 56 to 182 in FIG. 13), and PBCH spanning across 3 OFDM symbols and 240 subcarriers, but on one symbol leaving an unused part in the middle for SSS as show in FIG. 13. The possible time locations of SSBs within a half-frame may be determined by sub-carrier spacing and the periodicity of the half-frames, where SSBs are transmitted, may be configured by the network. During a half-frame, different SSBs may be transmitted in different spatial directions (i.e. using different beams, spanning the coverage area of a cell).

The PBCH may be used to carry Master Information Block (MIB) used by a UE during cell search and initial access procedures. The UE may first decode PBCH/MIB to receive other system information. The MIB may provide the UE with parameters required to acquire System Information Block 1 (SIB1), more specifically, information required for monitoring of PDCCH for scheduling PDSCH that carries SIB1. In addition, MIB may indicate cell barred status information. The MIB and SIB1 may be collectively referred to as the minimum system information (SI) and SIB1 may be referred to as remaining minimum system information (RMSI). The other system information blocks (SIBs) (e.g., SIB2, SIB3, . . . , SIB10 and SIBpos) may be referred to as Other SI. The Other SI may be periodically broadcast on DL-SCH, broadcast on-demand on DL-SCH (e.g., upon request from UEs in RRC Idle State, RRC Inactive State, or RRC connected State), or sent in a dedicated manner on DL-SCH to UEs in RRC Connected State (e.g., upon request, if configured by the network, from UEs in RRC Connected State or when the UE has an active BWP with no common search space configured).

Figure 14:
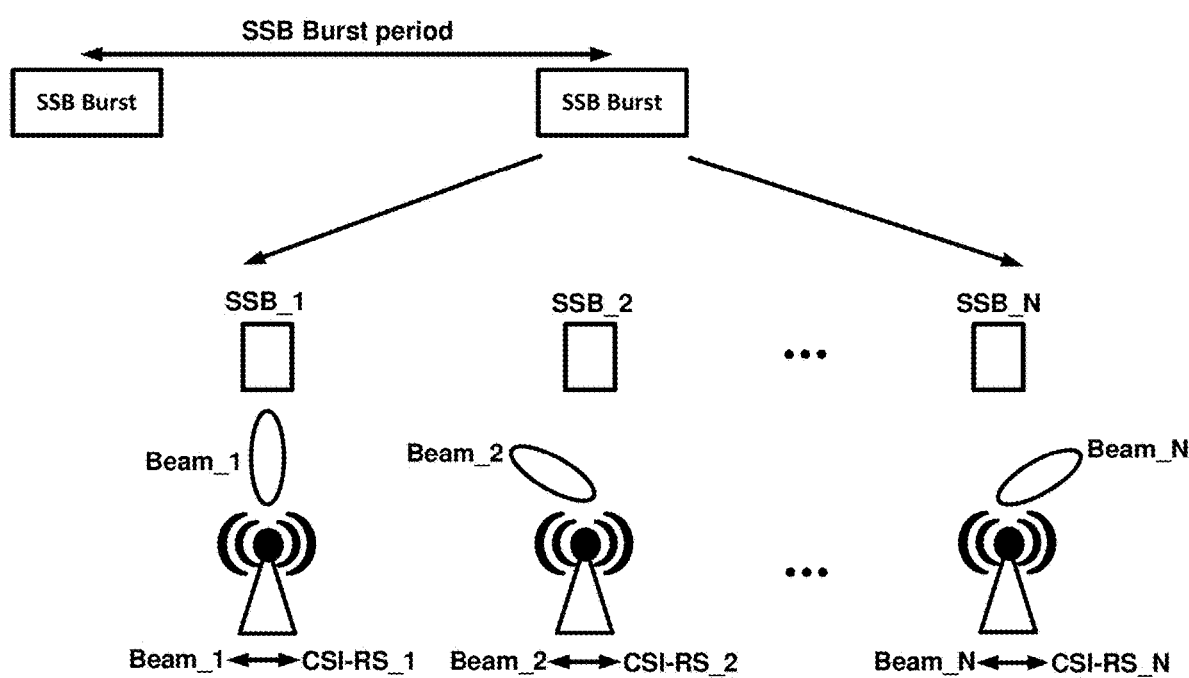
FIG. 14 shows example SSB burst transmissions according to some aspects of some of various exemplary embodiments of the present disclosure.

FIG. 14 shows example SSB burst transmissions according to some aspects of some of various exemplary embodiments of the present disclosure. An SSB burst may include N SSBs and each SSB of the N SSBs may correspond to a beam. The SSB bursts may be transmitted according to a periodicity (e.g., SSB burst period). During a contention-based random access process, a UE may perform a random access resource selection process, wherein the UE first selects an SSB before selecting a RA preamble. The UE may select an SSB with an RSRP above a configured threshold value. In some embodiments, the UE may select any SSB if no SSB with RSRP above the configured threshold is available. A set of random access preambles may be associated with an SSB. After selecting an SSB, the UE may select a random access preamble from the set of random access preambles associated with the SSB and may transmit the selected random access preamble to start the random access process.

In some embodiments, a beam of the N beams may be associated with a CSI-RS resource. A UE may measure CSI-RS resources and may select a CSI-RS with RSRP above a configured threshold value. The UE may select a random access preamble corresponding to the selected CSI-RS and may transmit the selected random access process to start the random access process. If there is no random access preamble associated with the selected CSI-RS, the UE may select a random access preamble corresponding to an SSB which is Quasi-Collocated with the selected CSI-RS.

In some embodiments, based on the UE measurements of the CSI-RS resources and the UE CSI reporting, the base station may determine a Transmission Configuration Indication (TCI) state and may indicate the TCI state to the UE, wherein the UE may use the indicated TCI state for reception of downlink control information (e.g., via PDCCH) or data (e.g., via PDSCH). The UE may use the indicated TCI state for using the appropriate beam for reception of data or control information. The indication of the TCI states may be using RRC configuration or in combination of RRC signaling and dynamic signaling (e.g., via a MAC Control element (MAC CE) and/or based on a value of field in the downlink control information that schedules the downlink transmission). The TCI state may indicate a Quasi-Colocation (QCL) relationship between a downlink reference signal such as CSI-RS and the DM-RS associated with the downlink control or data channels (e.g., PDCCH or PDSCH, respectively).

In some embodiments, the UE may be configured with a list of up to M TCI-State configurations, using Physical Downlink Shared Channel (PDSCH) configuration parameters, to decode PDSCH according to a detected PDCCH with DCI intended for the UE and the given serving cell, where M may depends on the UE capability. Each TCI-State may contain parameters for configuring a QCL relationship between one or two downlink reference signals and the DM-RS ports of the PDSCH, the DM-RS port of PDCCH or the CSI-RS port(s) of a CSI-RS resource. The quasi co-location relationship may be configured by one or more RRC parameters. The quasi co-location types corresponding to each DL RS may take one of the following values: 'QCL-TypeA': {Doppler shift, Doppler spread, average delay, delay spread}; 'QCL-TypeB': {Doppler shift, Doppler spread}; 'QCL-TypeC': {Doppler shift, average delay}; 'QCL-TypeD': {Spatial Rx parameter}. The UE may receive an activation command (e.g., a MAC CE), used to map TCI states to the codepoints of a DCI field.

Figure 15:
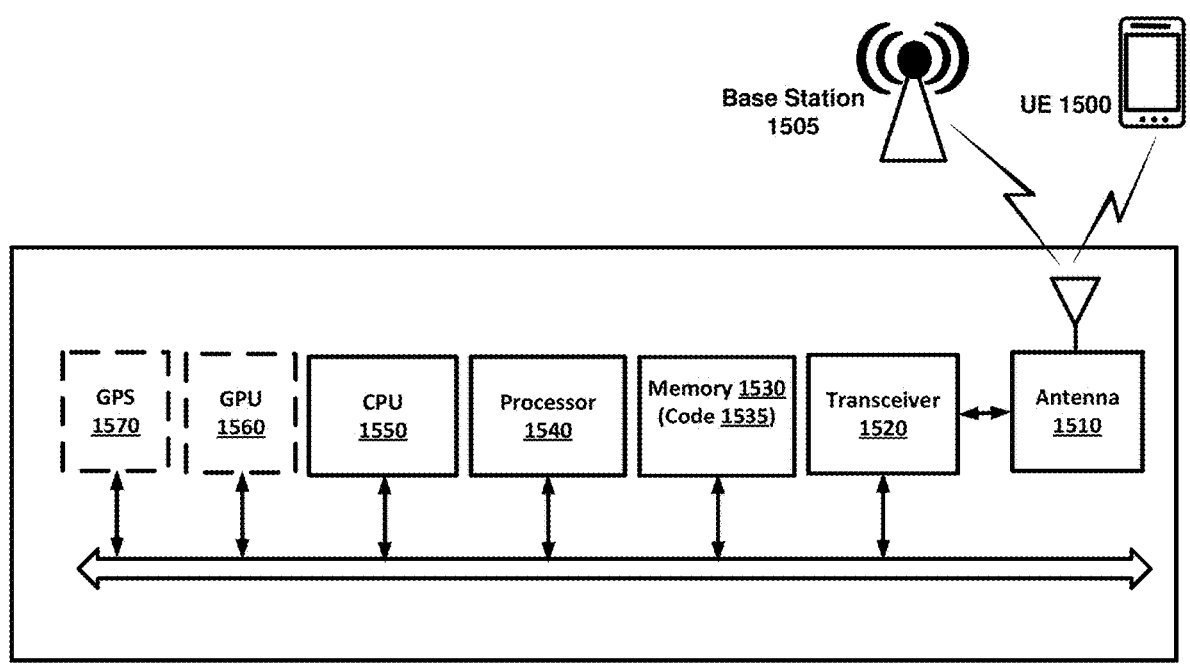
FIG. 15 shows example components of a user equipment and a base station for transmission and/or reception according to some aspects of some of various exemplary embodiments of the present disclosure.

FIG. 15 shows example components of a user equipment and a base station for transmission and/or reception according to some aspects of some of various exemplary embodiments of the present disclosure. In one embodiment, the illustrative components of FIG. 15 may be considered to be illustrative of functional blocks of an illustrative base station 1505. In another embodiment, the illustrative components of FIG. 15 may be considered to be illustrative of functional blocks of an illustrative user equipment 1500. Accordingly, the components illustrated in FIG. 15 are not necessarily limited to either a user equipment or base station.

Antenna 1510 may be used for transmission or reception of electromagnetic signals. The Antenna 1510 may comprise one or more antenna elements and may enable different input-output antenna configurations including Multiple-Input Multiple Output (MIMO) configuration, Multiple-Input Single-Output (MISO) configuration and Single-Input Multiple-Output (SIMO) configuration. In some embodiments, the Antenna 150 may enable a massive MIMO configuration with tens or hundreds of antenna elements. The Antenna 1510 may enable other multi-antenna techniques such as beamforming. In some examples and depending on the UE 1500 capabilities or the type of UE 1500 (e.g., a low-complexity UE), the UE 1500 may support a single antenna only.

The transceiver 1520 may communicate bi-directionally, via the Antenna 1510, wireless links as described herein. For example, the transceiver 1520 may represent a wireless transceiver at the UE and may communicate bi-directionally with the wireless transceiver at the base station or vice versa. The transceiver 1520 may include a modem to modulate the packets and provide the modulated packets to the Antennas 1510 for transmission, and to demodulate packets received from the Antennas 1510.

The memory 1530 may include RAM and ROM. The memory 1530 may store computer-readable, computer-executable code 1535 including instructions that, when executed, cause the processor to perform various functions described herein. In some examples, the memory 1530 may contain, among other things, a Basic Input/output System (BIOS) which may control basic hardware or software operation such as the interaction with peripheral components or devices.

The processor 1540 may include a hardware device with processing capability (e.g., a general purpose processor, a DSP, a CPU, a microcontroller, an ASIC, an FPGA, a programmable logic device, a discrete gate or transistor logic component, a discrete hardware component, or any combination thereof). In some examples, the processor 1540 may be configured to operate a memory using a memory controller. In other examples, a memory controller may be integrated into the processor 1540. The processor 1540 may be configured to execute computer-readable instructions stored in a memory (e.g., the memory 1530) to cause the UE 1500 or the base station 1505 to perform various functions.

The Central Processing Unit (CPU) 1550 may perform basic arithmetic, logic, controlling, and Input/output (I/O) operations specified by the computer instructions in the Memory 1530. The user equipment 1500 and/or the base station 1505 may include additional peripheral components such as a graphics processing unit (GPU) 1560 and a Global Positioning System (GPS) 1570. The GPU 1560 is a specialized circuitry for rapid manipulation and altering of the Memory 1530 for accelerating the processing performance of the user equipment 1500 and/or the base station 1505. The GPS 1570 may be used for enabling location-based services or other services for example based on geographical position of the user equipment 1500.

Figure 16:
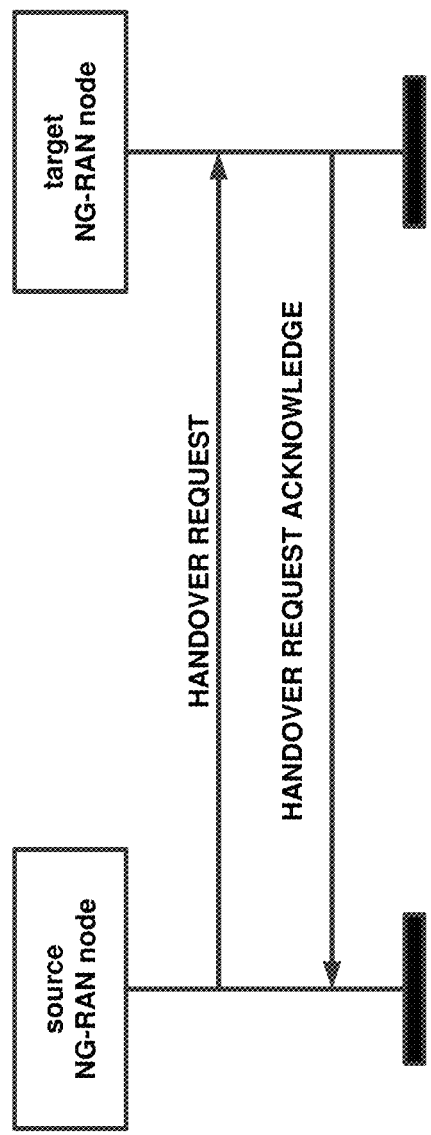
FIG. 16 shows an example handover preparation procedure according to some aspects of some of various exemplary embodiments of the present disclosure.

In some examples, a Handover Preparation Procedure may be performed as shown in FIG. 16. The Handover Preparation procedure may be used to establish necessary resources in an NG-RAN node for an incoming handover. If the procedure concerns a conditional handover, parallel transactions may be allowed. Possible parallel requests may be identified by the target cell ID when the source UE AP IDs are the same.

In some examples, a source NG-RAN node (e.g., a source hNB) may initiate the Handover Preparation Procedure by sending the HANDOVER REQUEST message to a target NG-RAN node (e.g., a target gNB). When the source NG-RAN node sends the HANDOVER REQUEST message, it may start a timer TXnRELOCprep.

In some examples, if the Conditional Handover Information Request IE is contained in the HANDOVER REQUEST message, the target NG-RAN node may consider that the request concerns a conditional handover and may include the Conditional Handover Information Acknowledge IE in the HANDOVER REQUEST ACKNOWLEDGE message.

In some examples, upon reception of the HANDOVER REQUEST ACKNOWLEDGE message, the source NG-RAN node may stop the timer TXnRELOCprep and may terminate the Handover Preparation procedure. If the procedure was initiated for an immediate handover, the source NG-RAN node may start the timer TXnRELOCoverall. The source NG-RAN node may then be defined to have a Prepared Handover for that Xn UE-associated signaling.

In some examples, at reception of the HANDOVER REQUEST message the target NG-RAN node may prepare the configuration of the AS security relation between the UE and the target NG-RAN node by using the information in the UE Security Capabilities IE and the AS Security Information IE in the UE Context Information IE of the HANDOVER REQUEST message.

In some examples, a PDU Session Resource Setup List IE may be contained in the HANDOVER REQUEST message. The target NG-RAN node may report in the HANDOVER REQUEST ACKNOWLEDGE message the successful establishment of the result for all the requested PDU session resources. When the target NG-RAN node reports the unsuccessful establishment of a PDU session resource, the cause value may be precise enough to enable the source NG-RAN node to know the reason for the unsuccessful establishment.

In some examples, for each PDU session if the PDU Session Aggregate Maximum Bit Rate IE is included in the PDU Session Resources To Be Setup List IE contained in the HANDOVER REQUEST message, the target NG-RAN node may store the received PDU Session Aggregate Maximum Bit Rate in the UE context and may use it when enforcing traffic policing for Non-GBR QoS flows for the concerned UE.

In some examples, for each QoS flow for which the source NG-RAN node proposes to perform forwarding of downlink data, the source NG-RAN node may include the DL Forwarding IE set to "DL forwarding proposed" within the Data Forwarding and Offloading Info from source NG-RAN node IE in the PDU Session Resources To Be Setup List IE in the HANDOVER REQUEST message. The source NG-RAN node may include the DL Forwarding IE set to "DL forwarding proposed" for all the QoS flows mapped to a DRB, if it requests a DAPS handover for that DRB. For a PDU session that the target NG-RAN node decides to admit the data forwarding for at least one QoS flow, the target NG-RAN node includes the PDU Session level DL data forwarding GTP-U Tunnel Endpoint IE within the Data Forwarding Info from target NG-RAN node IE in the PDU Session Resource Admitted Info IE contained in the PDU Session Resources Admitted List IE in the HANDOVER REQUEST ACKNOWLEDGE message.

In some examples, if the HANDOVER REQUEST ACKNOWLEDGE message contains the UL Forwarding GTP Tunnel Endpoint IE for a given DRB in the Data Forwarding Response DRB List IE within Data Forwarding Info from target NG-RAN node IE in the PDU Session Resources Admitted List IE and the source NG-RAN node accepts the data forwarding proposed by the target NG-RAN node, the source NG-RAN node may perform forwarding of uplink data for the DRB.

In some examples, if the Mobility Restriction List IE is contained in the HANDOVER REQUEST message, the target NG-RAN node may store the information received in the Mobility Restriction List IE in the UE context; may use this information to determine a target for the UE during subsequent mobility action for which the NG-RAN node provides information about the target of the mobility action towards the UE, except when one of the PDU sessions has a particular ARP value in which case the information may not apply; may use this information to select a proper SCG during dual connectivity operation; may use this information to select proper RNA(s) for the UE when moving the UE to RRC_INACTIVE. In some examples, if the Mobility Restriction List IE is not contained in the HANDOVER REQUEST message, the target NG-RAN node may consider that no roaming and no access restriction apply to the UE.

Figure 17:
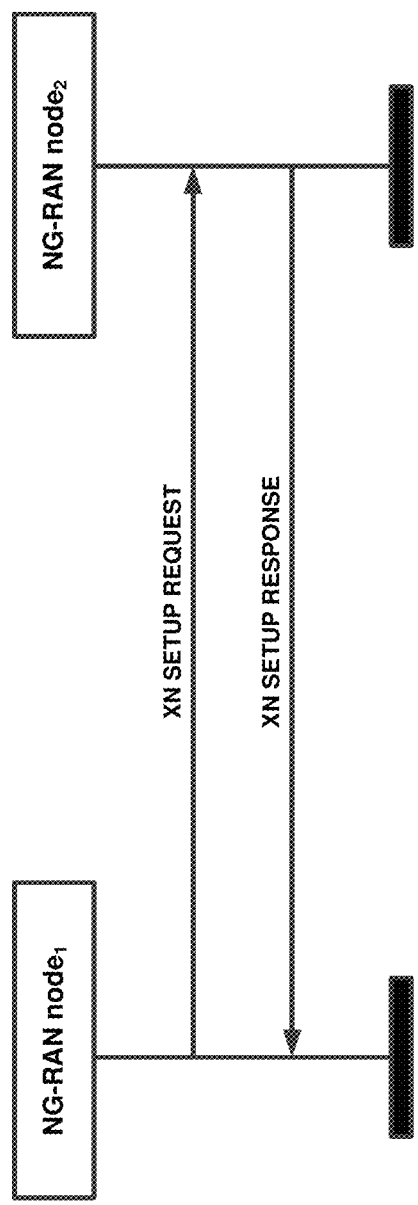
FIG. 17 shows an example Xn Setup procedure according to some aspects of some of various exemplary embodiments of the present disclosure.

In some examples, an Xn Setup procedure may be applied as shown in FIG. 17. The purpose of the Xn Setup procedure may be to exchange application level configuration data needed for two NG-RAN nodes to interoperate correctly over the Xn-C interface. In some examples, If Xn-C signaling transport is shared among multiple Xn-C interface instances, one Xn Setup procedure may be issued per Xn-C interface instance to be setup, i.e. several Xn Setup procedures may be issued via the same TNL association after that TNL association has become operational. In some examples, exchange of application level configuration data may apply between two NG-RAN nodes in case the SN (i.e. the gNB) does not broadcast system information other than for radio frame timing and SFN.

In some examples, the NG-RAN node1 initiates the procedure by sending the XN SETUP REQUEST message to the candidate NG-RAN node2. The candidate NG-RAN node2 may reply with the XN SETUP RESPONSE message.

In some examples, a HANDOVER REQUEST message may be sent by the source NG-RAN node to the target NG-RAN node to request the preparation of resources for a handover. The direction of this message may be from a source NG-RAN node to a target NG-RAN node. The HANDOVER REQUEST message may comprise a plurality of IEs/Group IEs. Example IEs/Group IEs include a Source NG-RAN node UE XnAP ID reference IE (allocated at the source NG-RAN node), a cause IE, a Target Cell Global ID IE and IEs included in UE context information.

A HANDOVER REQUEST ACKNOWLEDGE message may be sent by the target NG-RAN node to inform the source NG-RAN node about the prepared resources at the target. The direction of the HANDOVER REQUEST ACKNOWLEDGE message may be from the target NG-RAN node to the source NG-RAN node. The HANDOVER REQUEST ACKNOWLEDGE message may comprise a plurality of IEs/Group IEs.

Examples IEs/Group IEs included in the HANDOVER REQUEST ACKNOWLEDGE message may include a Source NG-RAN node UE XnAP ID (allocated at the source NG-RAN node), a Target NG-RAN node UE XnAP ID (allocated at the target NG-RAN node), a PDU Session Resources Admitted List, a PDU Session Resources Not Admitted List, a Target NG-RAN node To Source NG-RAN node Transparent Container (either includes the Handover-Command message, if the target NG-RAN node is an ng-eNB, or the HandoverCommand message, if the target NG-RAN node is a gNB), a UE context kept indicator, IEs related to conditional handover, etc.

In some examples, an XN SETUP REQUEST message may be sent by a NG-RAN node to a neighbouring NG-RAN node to transfer application data for an Xn-C interface instance. The direction of the XN SETUP REQUEST message may be from NG-RAN node1 to NG-RAN node2.

In some examples, an XN SETUP RESPONSE message may be sent by a NG-RAN node to a neighbouring NG-RAN node to transfer application data for an Xn-C interface instance. The direction of the XN SETUP RESPONSE message may be from an NG-RAN node2 to an NG-RAN node1.

In some examples, network-controlled mobility may apply to UEs in RRC_CONNECTED and maybe categorized into two types of mobility: cell level mobility and beam level mobility.

Figure 18:
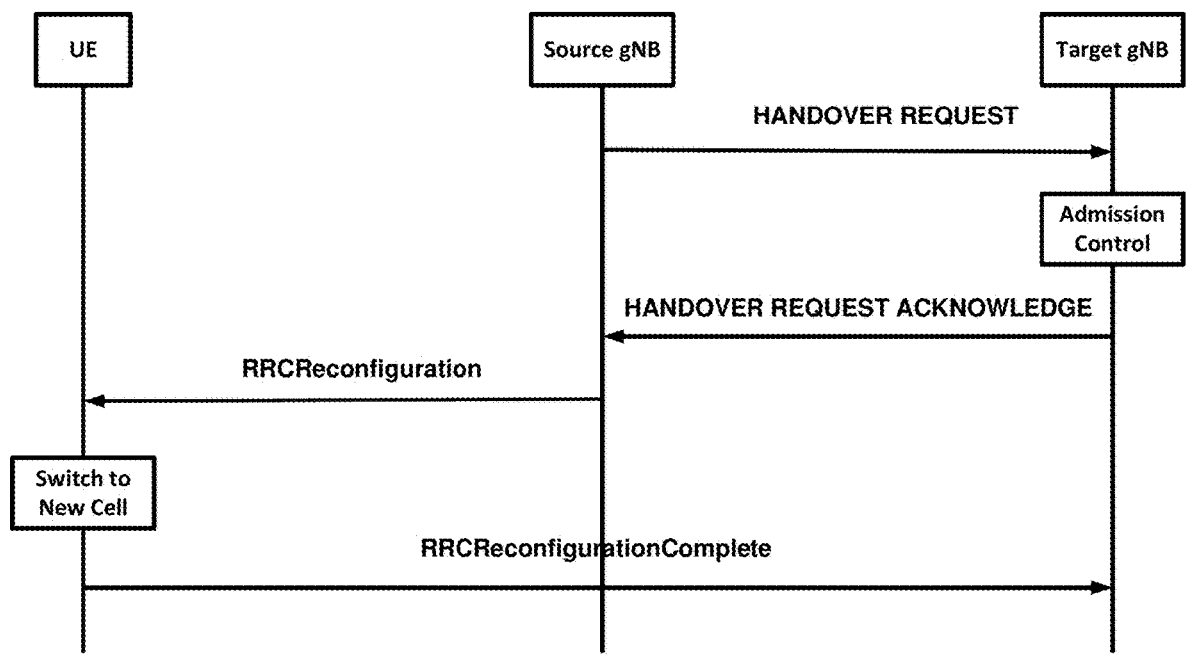
FIG. 18 shown an example handover procedure according to some aspects of some of various exemplary embodiments of the present disclosure.

Cell Level Mobility may require explicit RRC signaling to be triggered, i.e. handover. For inter-gNB handover, the signaling procedures may consist of at least the following elemental components as shown in FIG. 18: The source gNB may initiate handover and issues a HANDOVER REQUEST over the Xn interface. The target gNB may perform admission control and may provide the new RRC configuration as part of the HANDOVER REQUEST ACKNOWLEDGE. The source gNB may provide the RRC configuration to the UE by forwarding the RRCReconfiguration message received in the HANDOVER REQUEST ACKNOWLEDGE. The RRCReconfiguration message may include at least cell ID and all information required to access the target cell so that the UE can access the target cell without reading system information. For some cases, the information required for contention-based and contention-free random access may be included in the RRCReconfiguration message. The access information to the target cell may include beam specific information, if any. The UE may move the RRC connection to the target gNB and may reply with the RRCReconfigurationComplete.

In some examples in case of dual active protocol stack (DAPS) handover, the UE may continue the downlink user data reception from the source gNB until releasing the source cell and continues the uplink user data transmission to the source gNB until successful random access procedure to the target gNB.

In some examples, the handover mechanism triggered by RRC may require the UE at least to reset the MAC entity and re-establish RLC, except for DAPS handover, where upon reception of the handover command, the UE: may create a MAC entity for target; may establish the RLC entity and an associated DTCH logical channel for target for each DRB configured with DAPS; for the DRB configured with DAPS, may reconfigure the PDCP entity with separate security and ROHC functions for source and target and associates them with the RLC entities configured by source and target respectively; may retain the rest of the source configurations until release of the source.

In some examples, RRC managed handovers with and without PDCP entity re-establishment may be supported. For DRBs using RLC AM mode, PDCP may either be re-established together with a security key change or initiate a data recovery procedure without a key change. For DRBs using RLC UM mode and for SRBs, PDCP may either be re-established together with a security key change or may remain as it is without a key change.

In some examples, data forwarding, in-sequence delivery and duplication avoidance at handover may be guaranteed when the target gNB uses the same DRB configuration as the source gNB.

In some examples, Beam Level Mobility may not require explicit RRC signaling to be triggered. The gNB may provide via RRC signaling the UE with measurement configuration containing configurations of SSB/CSI resources and resource sets, reports and trigger states for triggering channel and interference measurements and reports. Beam Level Mobility may be dealt with at lower layers by means of physical layer and MAC layer control signaling, and RRC may not be required to know which beam is being used at a given point in time.

In some examples, SSB-based Beam Level Mobility may be based on the SSB associated to the initial DL BWP and may be configured for the initial DL BWPs and for DL BWPs containing the SSB associated to the initial DL BWP. For other DL BWPs, Beam Level Mobility may be performed based on CSI-RS.

In some examples, the U-plane handling during the Intra-NR-Access mobility activity for UEs in RRC_CONNECTED may take the following principles into account to avoid data loss during HO: During HO preparation, U-plane tunnels may be established between the source gNB and the target gNB; During HO execution, user data may be forwarded from the source gNB to the target gNB; Forwarding may take place in order as long as packets are received at the source gNB from the UPF or the source gNB buffer has not been emptied. During HO completion: The target gNB may send a path switch request message to the AMF to inform that the UE has gained access and the AMF then may trigger path switch related 5GC internal signaling and actual path switch of the source gNB to the target gNB in UPF; The source gNB may continue forwarding data as long as packets are received at the source gNB from the UPF or the source gNB buffer has not been emptied.

In some examples, a Conditional Handover (CHO) may be defined as a handover that is executed by the UE when one or more handover execution conditions are met. The UE may start evaluating the execution condition(s) upon receiving the CHO configuration, and may stop evaluating the execution condition(s) once a handover is executed (legacy handover or conditional handover execution).

The following principles may apply to CHO: The CHO configuration may contain the configuration of CHO candidate cell(s) generated by the candidate gNB(s) and execution condition(s) generated by the source gNB. An execution condition may illustratively consist of one or two trigger condition(s). Only single RS type maybe supported and at most two different trigger quantities (e.g. RSRP and RSRQ, RSRP and SINR, etc.) may be configured simultaneously for the evaluation of CHO execution condition of a single candidate cell. Before any CHO execution condition is satisfied, upon reception of HO command (without CHO configuration), the UE may execute the HO procedure, regardless of any previously received CHO configuration. While executing CHO, i.e. from the time when the UE starts synchronization with target cell, UE may not monitor source cell. CHO may not be supported for NG-C based handover in this release of the specification.

In some examples, an IE SL-BWP-Config may be used to configure the UE specific NR sidelink communication on one particular sidelink bandwidth part. A sl-BWP-Generic field may indicate the generic parameters on the configured sidelink BWP. A sl-BWP-PoolConfig field may indicate the resource pool configurations on the configured sidelink BWP. A sl-LengthSymbols field may indicate the number of symbols used for sidelink in a slot without SL-SSB. A sl-StartSymbol field may indicate the starting symbol used for sidelink in a slot without SL-SSB. A sl-TxDirectCurrentLocation field may indicate the sidelink Tx/Rx Direct Current location for the carrier.

In some examples, a IE SL-BWP-ConfigCommon may be used to configure the cell-specific configuration information on one particular sidelink bandwidth part. A genericParameters field may indicate the generic parameters on the configured sidelink BWP. A sl-BWP-PoolConfigCommon field may indicate the resource pool In some examples, an IE SL-BWP-PoolConfig may be used to configure NR sidelink communication resource pool. A sl-RxPool field may indicate the receiving resource pool on the configured BWP. For the PSFCH related configuration, if configured, may be used for PSFCH transmission/reception. If the field is included, it may replace any previous list, i.e. all the entries of the list are replaced and each of the SL-ResourcePool entries is considered to be newly created. A sl-TxPoolExceptional field may indicate the resources by which the UE is allowed to transmit NR sidelink communication in exceptional conditions on the configured BWP. For the PSFCH related configuration, if configured, may be used for PSFCH transmission/reception. A sl-TxPoolScheduling field may indicate the resources by which the UE is allowed to transmit NR sidelink communication based on network scheduling on the configured BWP. For the PSFCH related configuration, if configured, may be used for PSFCH transmission/reception. A sl-TxPoolSelectedNormal field may indicate the resources by which the UE is allowed to transmit NR sidelink communication by UE autonomous resource selection on the configured BWP. For the PSFCH related configuration, if configured, may be used for PSFCH transmission/reception.

In some examples, the IE SL-BWP-PoolConfigCommon may be used to configure the cell-specific NR sidelink communication resource pool.

In some examples, the IE SL-ConfigDedicatedNR may specify the dedicated configuration information for NR sidelink communication. A sl-MeasConfigInfoToAddModList field may indicate the RSRP measurement configurations for unicast destinations to add and/or modify. A sl-MeasConfigInfoToReleaseList field may indicate the RSRP measurement configurations for unicast destinations to remove. A sl-RadioBearerToAddModList field may indicate one or multiple sidelink radio bearer configurations. A sl-FreqInfoToAddModList field may indicate the NR sidelink communication configuration on some carrier frequency (ies). A sl-ScheduledConfig field may indicate the configuration for UE to transmit NR sidelink communication based on network scheduling.

In some examples, the IE SL-ConfiguredGrantConfig may specify the configured grant configuration information for NR sidelink communication. A sl-ConfigIndexCG field may indicate the ID to identify configured grant for sidelink.

In some example, the IE SL-FreqConfig may specify the dedicated configuration information on one particular carrier frequency for NR sidelink communication. A sl-BWP-ToAddModList field may indicate the list of sidelink BWP(s) on which the NR sidelink communication configuration is to be added or reconfigured. A sl-BWP-ToReleaseList field may indicate the list of sidelink BWP(s) on which the NR sidelink communication configuration is to be released. A sl-Freq-Id field may indicate the identity of the SL-FreqConfig configuration. A sl-SCS-SpecificCarrierList field may indicate a set of UE specific channel bandwidth and location configurations for different subcarrier spacings (numerologies). The UE may use the configuration provided in this field for the purpose of channel bandwidth and location determination.

In some examples, the IE FreqConfigCommon may specify the cell-specific configuration information on one particular carrier frequency for NR sidelink communication. A sl-BWP-List field may indicate the list of sidelink BWP(s) on which the NR sidelink communication configuration.

In some examples, the IE SL-LogicalChannelConfig may be used to configure the sidelink logical channel parameters.

In some examples, the IE SL-MeasConfigCommon may be used to set the cell specific SL RSRP measurement configurations for unicast destionations.

In some examples, the IE SL-MeasConfigInfo may be used to set RSRP measurement configurations for unicast destinations.

In some examples, an IE SL-RadioBearerConfig may specify the sidelink DRB configuration information for NR sidelink communication.

In some examples, an IE SL-ReportConfigList may concern a list of SL measurement reporting configurations to add or modify for a destination.

In some examples, the IE SL-ResourcePool may specify the configuration information for NR sidelink communication resource pool. A sl-NumSubchannel field may indicate the number of subchannels in the corresponding resource pool, which may consist of contiguous PRBs only. A sl-RB-Number field may indicate the number of PRBs in the corresponding resource pool, which may consist of contiguous PRBs only. A sl-StartRB-Subchannel field may indicate the lowest RB index ofthe subchannel with the lowest index in the resource pool with respect to the lowest RB index of a SL BWP. A sl-SubchannelSize field may indicate the minimum granularity in frequency domain for the sensing for PSSCH resource selection in the unit of PRB.

In some examples, an IE SL-RLC-BearerConfig may specify the SL RLC bearer configuration information for NR sidelink communication.

In some examples, an IE SL-RadioBearerConfigIndex may be used to identify a SL RLC bearer configuration.

In some examples, an IE SL-ScheduledConfig may specify sidelink communication configurations used for network scheduled NR sidelink communication. A sl-CS-RNTI field may indicate the RNTI used to scramble CRC of DCI format 3_0. A sl-PSFCH-ToPUCCH field may for dynamic grant and configured grant type 2, configure the values of the PSFCH to PUCCH gap. A sl-RNTI field may indicate the C-RNTI used for monitoring the network scheduling to transmit NR sidelink communication (e.g., the mode 1).

Example embodiments enhance the handover procedure when a UE is communicating via a sidelink to the communication with uplink channel or downlink channel. In some examples, a communication may be established between the two UEs via a sidelink communication channel, generally referred to as "sidelink" or "sidelink transmission". At least one of the UEs moves into the coverage area of a base station. A handover procedure be enhanced to transfer the communication channel from the UE sidelink communication to the direct communication of the UE with the base station. In some examples, a communication via uplink or downlink may be established between a UE and a base station and the UE may leave the coverage area of the base station. A handover from DL to a SL communication may be beneficial.

In some examples, several services of the network may continue even if there is no connection between a UE and a base station. The service continuity may be important for first responders. The availability of the sidelink may be an important feature. In some examples, a direct connection via UL and DL channels with a base station may be preferred over the sidelink communication due to mor stability.

In some examples, a handover may need to be performed from a sidelink transmission to a UL or DL transmission once a UE gets into the vicinity of a base station. Further, to not lose an otherwise important connection when leaving the coverage area of a base station a handover procedure to another UE through a sidelink may be beneficial.

In some examples, two UE may be directly communicating with each other via a sidelink transmission. One of the UEs may communicate with a base station. The UE which is not communicating directly with the base station may come into the coverage area of the base station, which may triggers the handover procedure from the UE to the base station.

In some examples, at least two UE may be communicating with each other through the sidelink transmission. Further a base station may be involved such that at least one of the said UEs communicates directly via UL/DL with the base station. A user equipment, illustratively UE[0], may communicate directly with another user equipment, illustratively UE[1], via a sidelink. Further the user equipment UE[1] may communicate directly with the base station BS via a UU/DL or uplink or downlink transmission. The following may illustrate the situation: UE[0]↔UE[1]↔BS.

The UE[0] may move closer into the vicinity of the base station such that it enters the coverage area of the base station. A handover procedure (e.g., a handover) may be performed where the UE[0] is "handed over" from the sidelink based communication with UE[1] to a direct UL/DL communication with the base station. The following situation may be established after the handover: UE[1]↔BS↔UE[0]. In response to the handover, both UE[0] and UE[1] may communicate directly to the BS and there is no need any more for the sidelink. The sidelink may be dropped in favor of the more stable direct communication with the base station for UE[0].

Example actions to perform the handover may be as follows: The UE[0] may communicate with UE[1] via a sidelink. The UE[1] may communicate with the base station via UUDL. Since the UE[1] is communicating with the base station, it may transfer information about the base station to UE[0] to support the measurement and search for base stations. The UE[0] may use the measurement information to search other cells. Once the UE[0] comes into the vicinity of the base station, it may shows up in the measurement results since the base station is already on the preferred list of stations. If a certain threshold is reached the handover procedure may be performed such that the UE may directly communicate with the BS. The communication via the sidelink may be dropped since both UE now communicate directly to the base station.

In some examples, at least two user equipment may communicate with a base station. The user equipment may leave the coverage area of the base station. If that particular user equipment is still covered by the second user equipment coverage area a handover may be performed.

A first user equipment, illustratively UE[0], and a second user equipment, illustratively UE[I], may be connected to a base station and may communicate via uplink or downlink transmissions. The UE[0] may leave the coverage area of the base station, while remaining within the coverage area of the second user equipment UE[1]. A handover procedure of UE[0] from BS to UE[1] using the sidelink capabilities of the UE[1] may be performed. The initial scenario may be illustrated as follows: UE[1]↔BS↔UE[0] which leads to the following by handover: UE[0]↔UE[1]↔BS.

In some examples, during the normal operation, the network or the BS may request regular measurements from the UEs. If for example the measurement results of UE[0] drops below a defined threshold it may start looking for other cells. Since the BS is connected with at least one other UE, illustratively UE[1], the base station may check for its sidelink capabilities. If the UE[1] confirms its sidelink capabilities, the BS may inform UE[0] about the existence of UE[1] and its sidelink capabilities. Besides searching for other cells the UE[0] may monitor neighboring UEs if they are available for sidelink connection. Once the UE[0] hits the threshold which triggers the handover, the handover procedure may be initiated. The two user equipment may communicate directly with each other through the sidelink.

In some examples, two or more UE may communicate using a sidelink. At least one of the UE comes into the coverage area of a base station. UL/DL transmission of the UE and the base station may be configured in addition to the sidelink.

Two UEs may communicate via a sidelink directly while not being in the coverage area of a base station. The UEs may communicate directly through the sidelink. UE[1]↔UE[0]. One of the UEs may enter the vicinity of a base station and may establish an UL/DL whereas the sidelink may stay alive leading to the following: UE[0]↔UE[1]↔BS.

Due to mobility, a UE may move to coverage areas of cells that may or may not be configured or suitable (e.g., due to frequency band that the cell operates) for sidelink communications. For example, a UE may move from coverage area of a cell configured with sidelink to coverage area of another cell that is not configured with sidelink or vice versa. Existing solutions for mobility management or handover do not take into account the sidelink support as a factor for handover decisions or procedures. Example embodiments enhance the mobility and handover procedures involving sidelink communications.

Figure 19:
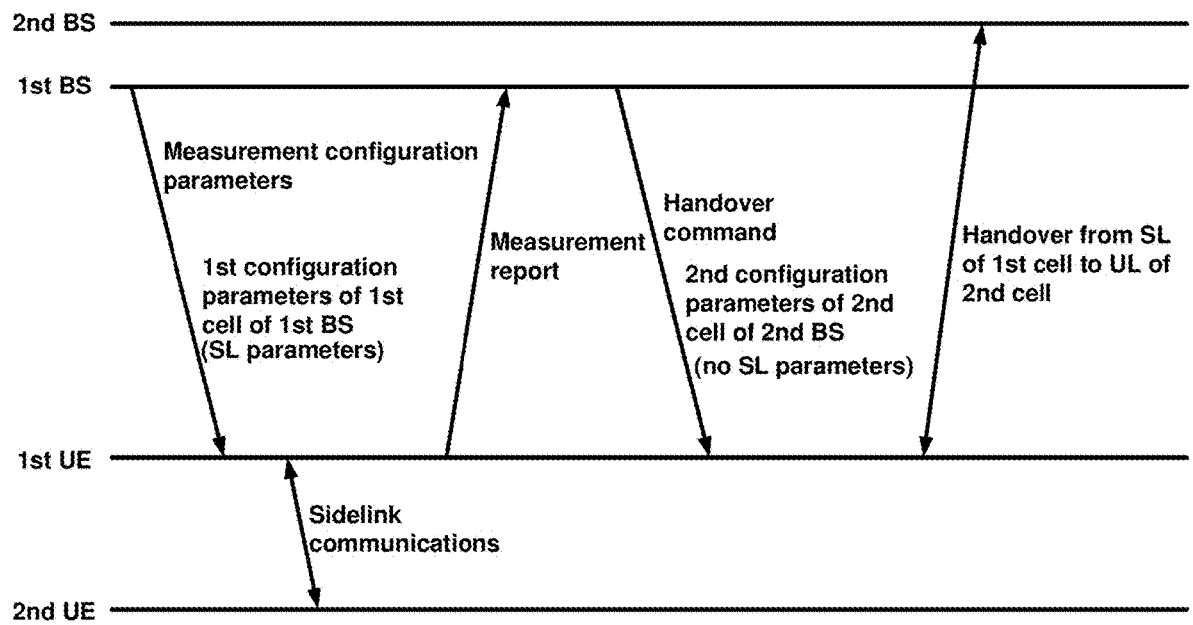
FIG. 19 shows an example process according to some aspects of some of various exemplary embodiments of the present disclosure.
Figure 20:
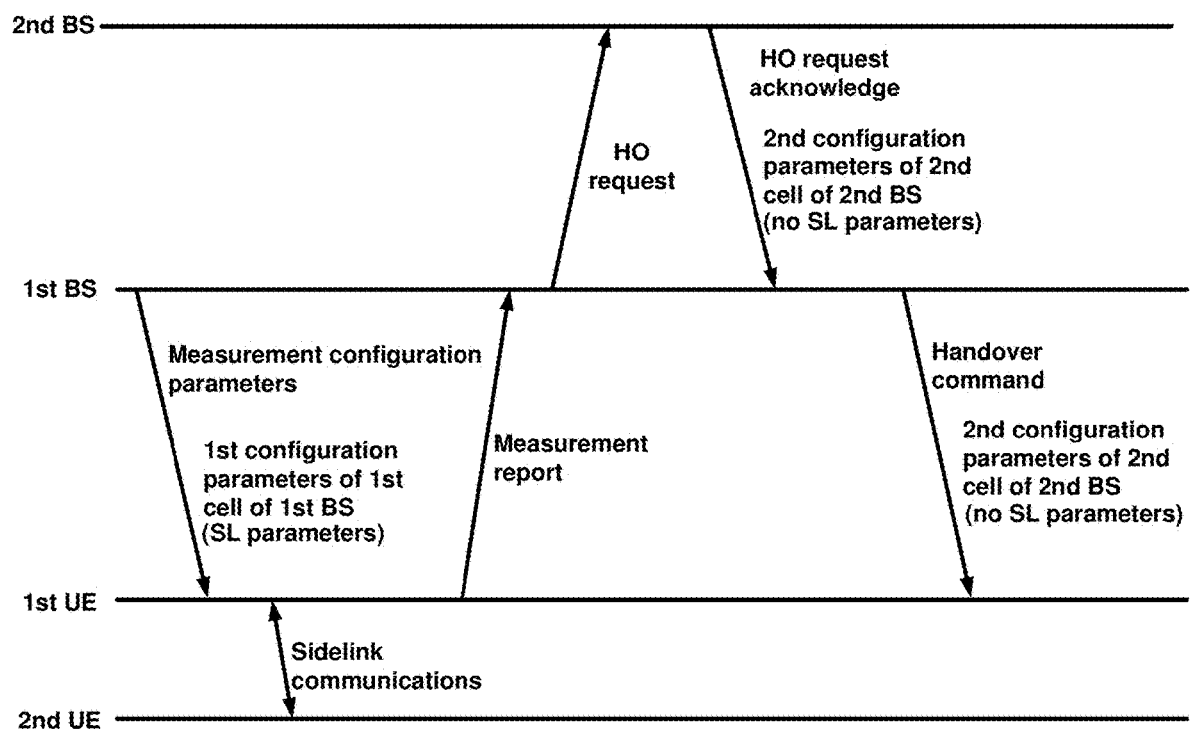
FIG. 20 shows an example process according to some aspects of some of various exemplary embodiments of the present disclosure.

In example embodiments as shown in FIG. 19 and FIG. 20, a first UE may receive from a first BS one or more messages (e.g., RRC messages) comprising configuration parameters. The configuration parameters may comprise measurement configuration parameters and first configuration parameters of a first cell. In an example, the first cell may be a primary cell and the first UE may be configured with additional secondary cells in case of carrier aggregation. The first cell maybe configured with sidelink parameters. For example, the sidelink parameters may include configuration parameters of a sidelink BWP, a sidelink resource pool, or other sidelink frequency configuration for sidelink communications of the first UE using the first cell. The configuration parameters can include a single parameter or various combination of parameters.

The first UE may use the first configuration parameters and may communicate with a second UE by establishing a sidelink with the second UE. For example, the first UE may communicate with the second UE based on the sidelink resource pool indicated by the sidelink configuration parameters. The first UE may use the measurement configuration parameters and may measure reference signals, may create and may transmit a measurement report to the first BS. The measurement report may be based on measuring reference signals and may include measurement information (e.g., signal strength, e.g., RSSI, RSRP, RSRQ, etc.). In some examples, the reference signals may be configured by the first base station for the first UE (e.g., based on the measurement configuration parameters). The configuration parameters of the reference signals may indicate radio resources of the reference signals and that the first UE may measure the reference signals based on the reference signal radio resources for creation of the measurement report. The UE may transmit the measurement report using an RRC message. Alternatively, the UE may transmit the measurement report based on radio resource management (RRM) configurations and procedures.

In response to reception of the measurement report, by the first BS from the first UE, the first BS may determine a handover trigger and may transmit, to the second BS, a handover request message indicating a request for handover of the first UE from the first cell of the first BS to a second cell of the second BS. The handover request message may be ab Xn Application protocol message transmitted via an Xn interface between the first BS and the second BS. In one embodiment, the second cell of the second BS may not be configured for sidelink transmissions or otherwise may not be available for sidelink communications. The characterization of availability for sidelink communication may also be referred to as the UE generally not usable for sidelink communications. The handover request message may comprise one or more of a source UE ID IE, a cause IE, a target cell ID IE, and UE context information.

In some examples, the first BS may receive a second message (e.g., an Xn Setup Request message in an Xn Setup procedure) from the second BS indicating configuration parameters of the second cell of the second BS. One or more information elements of the second message may indicate that the second cell of the second BS does not support or is not configured for sidelink communications, which can be communicated as an indication that second cell is not available for sidelink communications or sidelink transmissions. For example, the second message may comprise an information element with a Boolean value. Illustratively, a first value of the information element indicating that the second cell is useful for sidelink communications and a second value of the information element indicating that the second cell is useful for sidelink communications.

The first BS may determine to handover from the first cell of the first BS to the second cell of the second BS, wherein the determination is based, at least in part, whether the second cell of the second BS support sidelink communications. The determination can also include whether the first UE has established a sidelink while communicating via the first cell of the first BS. In some examples, the first cell may be configured with downlink and sidelink and may not be configured with uplink. Additionally, the second cell may not be configured with sidelink and may be configured with downlink and uplink. In some examples, the first cell may be configured with downlink, uplink and sidelink. Additionally, the second cell may not be configured with sidelink.

In some examples, the measurement report may comprise sidelink measurement information and the determination to request a handover with the second BS may further be based on the sidelink measurement information (e.g., based on measurement information indicating that the sidelink via the first cell has a quality below a threshold). In response to reception of the handover request, by the second BS from the first BS, the second BS may perform an admission control procedure and determine that the handover of the first UE from the first cell of the first BS to the second cell of the second BS is acceptable or characterized as acceptable. For example, in one embodiment, the second BS may make such a determination based on the UE or traffic load of the second cell or of the second BS. The second BS may transmit a handover request acknowledge message indicating that the handover of the first UE from the first cell of the first BS to the second cell of the second BS is allowed. The handover request acknowledge message may comprise an RRCReconfiguration message comprising configuration parameters of the second cell.

The first UE may receive from the first BS a first message comprising the second configuration parameters of the second cell (e.g., included in the RRCReconfiguration message included in the handover acknowledge message). The second configuration parameters may indicate that the second cell is not configured for sidelink communications, which can be communicated as an indication that second cell is not available for sidelink communications or sidelink transmissions. The first message may indicate a handover command and the first UE may switch from the first cell of the first BS to the second cell of the second BS, wherein the sidelink of the first cell is handed over to an uplink of the second cell. The handover from the first cell of the first BS to the second cell of the second BS may be based on a random access process. The first UE may start a random access process on the second cell of the second BS (e.g., based on random access configuration parameters of the second cell included in the RRCReonfiguration message). In some examples, the random access process may be a two-step random access process. In some examples, the random access process may be a four-step random access process. In some examples, the handover command may be for a conditional handover. The first UE may initiate a random access process in response to a condition being satisfied. In some examples, the handover command may comprise/indicate the condition for the conditional handover. In some examples, the condition for the conditional handover may be based on a quality of the second cell (e.g., determined based on measurement of the second cell).

Figure 21:
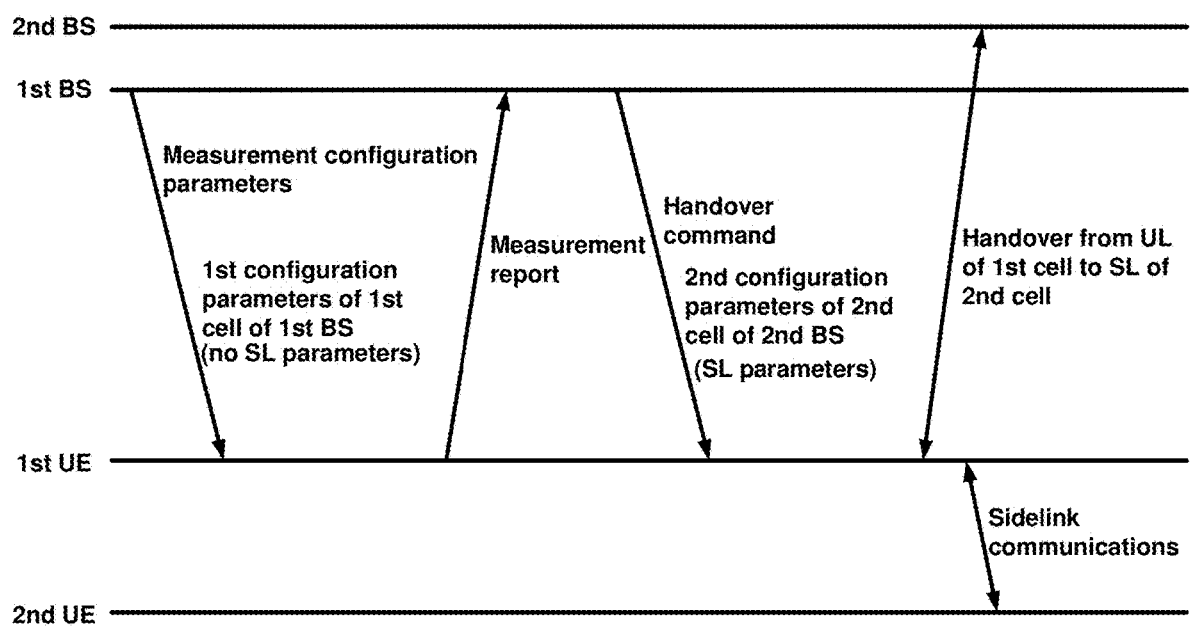
FIG. 21 shows an example process according to some aspects of some of various exemplary embodiments of the present disclosure.
Figure 22:
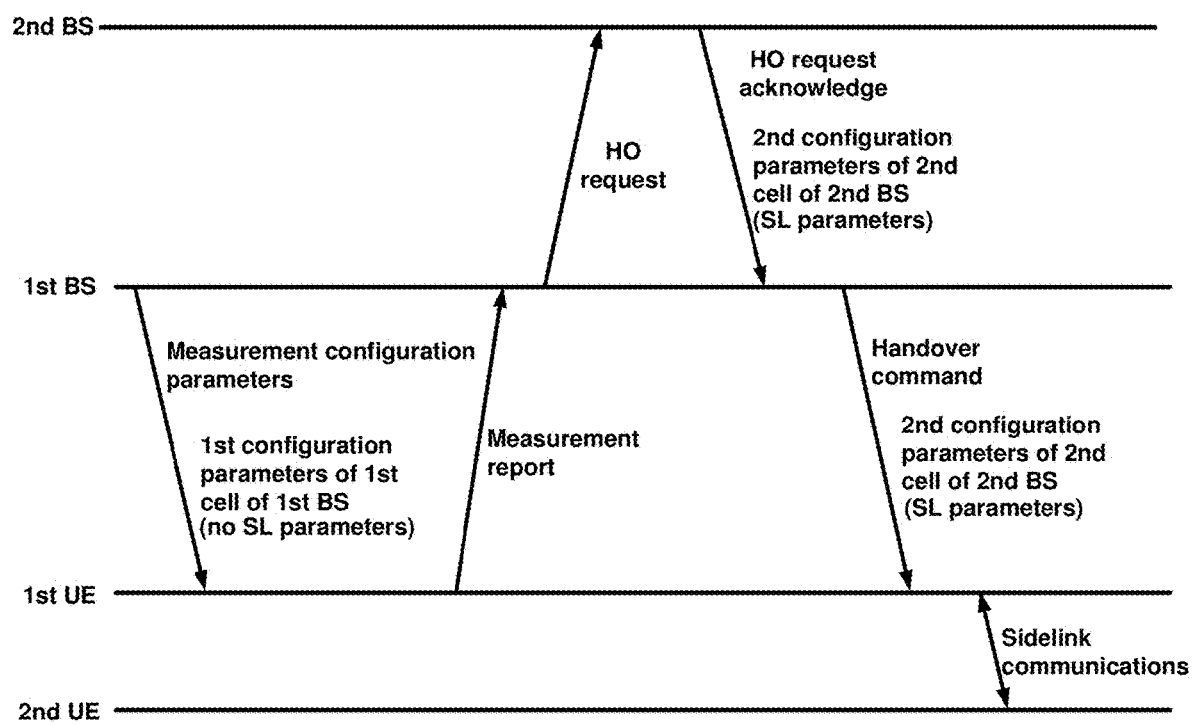
FIG. 22 shows an example process according to some aspects of some of various exemplary embodiments of the present disclosure.

In example embodiments as shown in FIG. 21 and FIG. 22, a first UE may receive from a first BS one or more messages (e.g., RRC messages) comprising configuration parameters. The configuration parameters may comprise measurement configuration parameters and first configuration parameters of a first cell. In an example, the first cell may be a primary cell and the first UE may be configured with additional secondary cells in case of carrier aggregation. The first cell may not be configured with sidelink parameters for sidelink communications, which can be communicated as an indication that second cell is not available for sidelink communications or sidelink transmissions. For example, the first cell may operate in a frequency band that sidelink is not configured. The first UE may use the measurement configuration parameters and may measure reference signals, may create and may transmit a measurement report to the first BS. The measurement report may be based on measuring reference signals and may include measurement information (e.g., signal strength, e.g., RSSI, RSRP, RSRQ, etc.). In some examples, the reference signals may be configured by the first base station for the first UE (e.g., based on the measurement configuration parameters). The configuration parameters of the reference signals may indicate radio resources of the reference signals and that the first UE may measure the reference signals based on the reference signal radio resources for creation of the measurement report. The wireless device may transmit the measurement report using an RRC message and/or based on radio resource management (RRM) configurations and procedures.

In response to reception of the measurement report, by the first BS from the first UE, the first BS may determine a handover trigger and may transmit, to the second BS, a handover request message indicating a request for handover of the first UE from the first cell of the first BS to a second cell of the second BS. The handover request message may be ab Xn Application protocol message transmitted via an Xn interface between the first BS and the second BS. The second cell of the second BS may be configured for sidelink communications, which can be communicated as an indication that second cell is available for sidelink communications or sidelink transmissions. The handover request message may comprise one or more of a source UE ID IE, a cause IE, a target cell ID IE, and UE context information.

In some examples, the first BS may receive a second message (e.g., an Xn Setup Request message in an Xn Setup procedure) from the second BS indicating configuration parameters of the second cell of the second BS. One or more information elements of the second message may indicate that the second cell of the second BS supports or is configured with/useful for sidelink communications. For example, the second message may comprise an information element with a Boolean value, a first value of the information element indicating that the second cell is useful for sidelink communications.

The first BS may determine to handover from the first cell of the first BS to the second cell of the second BS, wherein the determination is based, at least in part, on whether the second cell of the second BS supports sidelink communications. Additionally, the determination may be based on whether the first cell of the first BS supports sidelink (e.g., whether the first cell supports sidelink or whether the first cell does not support sidelink). In some examples, the second cell may be configured with downlink and sidelink and may not be configured with uplink. In some examples, the second cell may be configured with downlink, uplink and sidelink. In response to reception of the handover request, by the second BS from the first BS, the second BS may perform an admission control procedure and determine that the handover of the first UE from the first cell of the first BS to the second cell of the second BS is acceptable (e.g., based on the UE or traffic load of the second cell and/or of the second BS). The second BS may transmit a handover request acknowledge message indicating that the handover of the first UE from the first cell of the first BS to the second cell of the second BS is allowed. The handover request acknowledge message may comprise an RRCReconfiguration message comprising configuration parameters of the second cell.

The first UE may receive from the first BS a first message comprising the second configuration parameters of the second cell (e.g., included in the RRCReconfiguration message included in the handover acknowledge message). The second configuration parameters may indicate that the second cell is configured for sidelink communications, which can be communicated as an indication that second cell is available for sidelink communications or sidelink transmissions. The first message may indicate a handover command and the first UE may switch from the first cell of the first BS to the second cell of the second BS, wherein the uplink of the first cell is handed over to a sidelink of the second cell. The handover from the first cell of the first BS to the second cell of the second BS may be based on a random access process. The first UE may start a random access process on the second cell of the second BS (e.g., based on random access configuration parameters of the second cell included in the RRCReonfiguration message). In some examples, the random access process may be a two-step random access process. In some examples, the random access process may be a four-step random access process. In some examples, the handover command may be for a conditional handover. The first UE may initiate a random access process in response to a condition being satisfied. In some examples, the handover command may comprise/indicate the condition for the conditional handover. In some examples, the condition for the conditional handover may be based on a quality of the second cell (e.g., determined based on measurement of the second cell).

Figure 23:
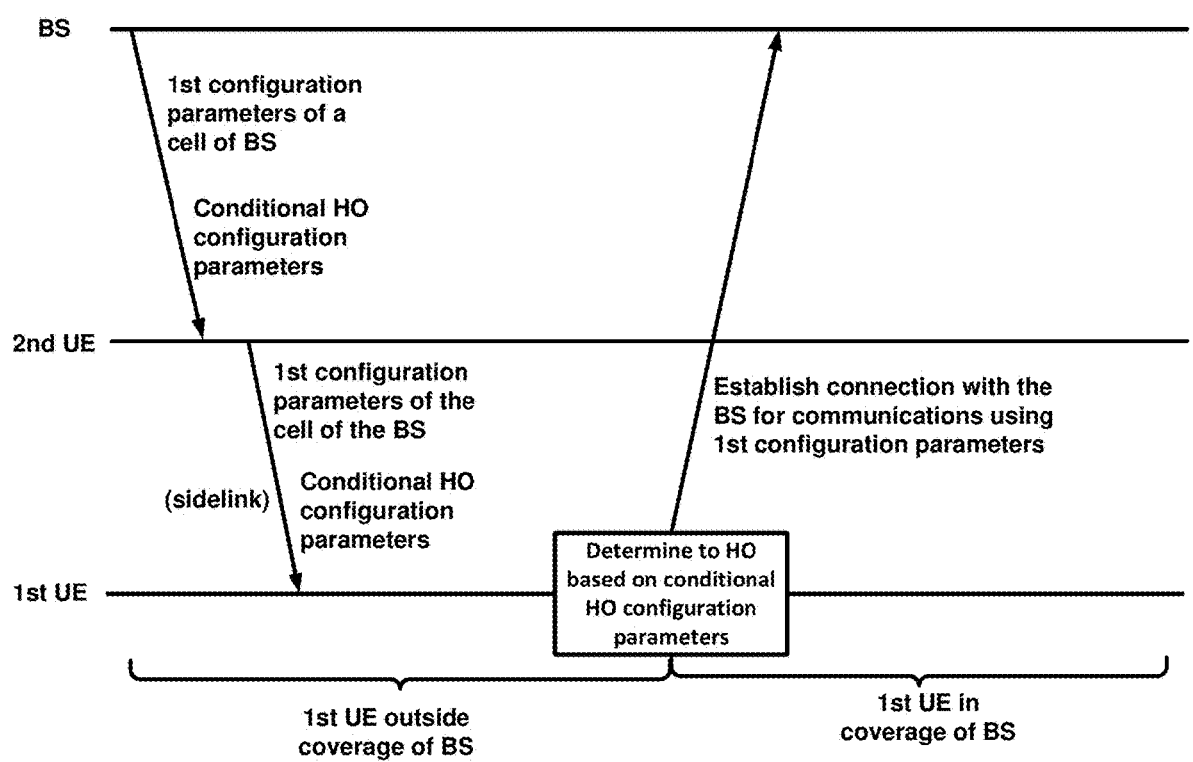
FIG. 23 shows an example process according to some aspects of some of various exemplary embodiments of the present disclosure.

In an example embodiment as shown in FIG. 23, a first UE may establish a sidelink with a second UE. The first UE may receive first configuration parameters of a cell and conditional handover configuration parameters from the second UE based on the established sidelink between the first UE and the second UE. The second UE may be in a coverage are of the cell of the BS and may have received the first configuration parameters of the cell of the BS and the conditional handover configuration parameters from the BS (e.g., via a downlink of the cell) and may transmit the first configuration parameters of the cell of the BS and the conditional handover configuration parameters to the first UE based on a sidelink established between the first UE and the second UE. The first UE may receive the first configuration parameters of the cell of the BS and the conditional handover configuration parameters from the second UE while being outside the coverage area of the BS.

The conditional handover configuration parameters may comprise/indicate a condition for establishing a condition with the BS. The first UE may determine (e.g., based on measuring reference signals and comparing the strength of the measurements with one or more thresholds (e.g., RRC configured thresholds)) that the condition is satisfied and may establish a connection with the base station over the cell using the first configuration parameters. The first UE may further receive measurement configurations from the second UE and may perform the measurement (for verifying if the condition for the conditional handover is satisfied) based on the measurement configuration parameters. The measurement configuration parameters may have been received by the second UE from the BS via a downlink of the cell. The first UE may establish the connection with the BS based on a random access process (e.g., two-step or four-step random access process). For example, the first configuration parameters may comprise random access configuration parameters and the random access process for establishing the connection with the BS may be based on the random access configuration parameters.

In an embodiment, a first UE may receive from a first BS one or more first messages comprising: measurement configuration parameters; and first configuration parameters, of a first cell, comprising sidelink parameters. The first UE may establish a sidelink with a second UE based on the sidelink parameters. The first UE may transmit to the first BS, a measurement report based on the measurement configuration parameters. The first UE may receive from the first BS and in response to the measurement report, a second message comprising second configuration parameters of a second cell of a second BS, wherein the second configuration parameters may not comprise sidelink parameters. The first UE may switch from the first cell of the first BS to the second cell of the second BS, wherein the sidelink of the first cell may be handed over to an uplink of the second cell.

In some embodiments, the first UE may measure, based on the measurement configuration parameters, reference signals associated with the second cell of the second base station (BS).

In some embodiments, the first UE may transmit the measurement report via a radio resource control (RRC) message.

In some embodiments, the first configuration parameters may comprise sidelink resource pool configuration parameters. The establishing the sidelink may comprise communicating, of the first user equipment (UE) with the second UE, using radio resources of the sidelink resource pool.

In some embodiments, the first message may be a handover command. In some embodiments, the first UE may initiate a random access process with the second cell of the second base station. In some embodiments, the handover command may be for conditional handover indicating a condition for handover. In some embodiments, the first user equipment (UE) may initiate, in response to the condition being satisfied, a random access process with the second cell of the second base station. In some embodiments, the random access process may be based on random access parameters associated with the second cell. The second configuration parameters of the second cell may include the random access parameters. In some embodiments, the condition may be based on a quality of the second serving cell.

In some embodiments, the second message may comprise a radio resource control (RRC) reconfiguration message comprising the second configuration parameters of the second cell of the second base station (BS).

In some embodiments, the first cell may be configured with downlink and sidelink. The first cell may not be configured with uplink. The second cell may be configured with downlink and uplink. The second cell may not be configured with sidelink.

In some embodiments, the first cell may be configured with downlink, uplink and sidelink. The second cell may be configured with downlink and uplink. The second cell may not be configured with sidelink.

In an embodiment, a first base station (BS) may transmit to a first user equipment (UE), one or more first messages comprising: measurement configuration parameters; and first configuration parameters, of a first cell, comprising sidelink parameters. The first BS may receive from the first UE a measurement report based on the measurement configuration parameters. The first BS may transmit to the second BS, based on the measurement report, a handover request message for handover of the first UE from the first cell of the first BS to a second cell of the second BS. The first BS may receive from the second BS, a handover request acknowledge message comprising second configuration parameters of the second cell of the second BS, wherein the second configuration parameters may not comprise sidelink parameters. The first BS may transmit to the first UE, a second message comprising the second configuration parameters indicating a handover from the sidelink of the first cell to an uplink of the second cell.

In some embodiments, the first BS may receive from the second BS, a third message comprising cell parameters, associated with the second cell, indicating that the second cell is not configured with sidelink communications. In some embodiments, the third message may be an Xn setup response message. In some embodiments, the receiving, by the first base station (BS) from the second BS, the Xn setup response message may be in response to transmitting, by the first base station (BS) to the second BS, an Xn setup request message. In some embodiment, the first base station (BS) may determine a handover of the first user equipment (UE) from the first cell of the first BS to a second cell of the second BS based on the cell parameters. In some embodiments, the first BS may determine to handover the first UE from the first cell configured with sidelink to the second cell not configured with sidelink. In some embodiments, the third message may comprise an information element indicating that the second cell is not useful for sidelink communications. In some embodiments, the information element may be a Boolean parameter. A first value of the information element may indicate that the second cell is useful for sidelink communications. A second value of the information element may indicate that the second cell is not useful for sidelink communications.

In some embodiments, the measurement configuration parameters may comprise configuration parameters of reference signals. The measurement report may be based on measurement of the reference signals.

In some embodiments, the handover request message may be an Xn application protocol message transmitted via an Xn interface between the first base station (BS) and the second BS.

In some embodiments, the handover request message may comprise one or more of: a source user equipment (UE) identifier information element; a handover cause information element; a target cell identifier information element; and UE context information.

In an embodiment, a first UE may receive from a first BS, one or more first messages comprising: measurement configuration parameters; and first configuration parameters, of a first cell, not comprising sidelink parameters. The first UE may transmit to the first BS, a measurement report based on the measurement configuration parameters. The first UE may receive from the first BS and in response to the measurement report, a second message comprising second configuration parameters of a second cell of a second BS, wherein the second configuration parameters comprise sidelink parameters. The first UE may switch, from the first cell of the first BS to the second cell of the second BS, wherein an uplink of the first cell is handed over to the sidelink of the second cell.

In some embodiments, the second configuration parameters may comprise sidelink resource pool configuration parameters of a sidelink resource pool on the second cell. In some embodiments, the first UE may establish a sidelink with a second UE, after the handover and using radio resources of the sidelink resource pool of the second cell.

In some embodiments, the second cell may be configured with downlink and sidelink. The second cell may not be configured with uplink.

In some embodiments, the second cell may be configured with downlink, uplink and sidelink.

In an embodiment, a first BS may transmit to a first UE one or more first messages comprising: measurement configuration parameters; and first configuration parameters, of a first cell, not comprising sidelink parameters. The first BS may receive from the first UE, a measurement report based on the measurement configuration parameters. The first BS may transmit, based on the measurement report, to the second BS, a handover request message for handover of the first UE from the first cell of the first BS to a second cell of the second BS. The first BS may receive from the second BS a handover request acknowledge message comprising second configuration parameters of the second cell of the second BS, wherein the second configuration parameters may comprise sidelink parameters. The first BS may transmit, to the first UE, a second message comprising the second configuration parameters indicating a handover from an uplink of the first cell to the sidelink of the second cell.

In some embodiments, the first BS may receive from the second BS, a third message comprising cell parameters, associated with the second cell, indicating that the second cell is configured with sidelink communications. In some embodiments, the first base station (BS) may determine a handover of the first user equipment (UE) from the first cell of the first BS to a second cell of the second BS based on the cell parameters. In some embodiments, the first BS may determine to handover from the first cell not configured with sidelink to the second cell configured with sidelink. In some embodiments, the third message may comprise an information element indicating that the second cell is useful for sidelink communications.

In an embodiment, a first UE may receive from a second UE and based on sidelink communications, first configuration parameters of a cell and conditional handover configuration parameters, wherein: the first configuration parameters and the conditional handover configuration parameters may be received by the second UE from a base station (BS); the second UE may be in a coverage area of the BS and communicates with the BS using an uplink and a downlink configured for the cell; the receiving the configuration parameters may be while the first UE is not in the coverage area of the base station; and the conditional handover configuration parameters may indicate a condition for establishing a connection on the cell with the BS. The first UE may determine, based on the conditional handover configuration parameters, that the condition is satisfied. The first UE may establish a connection with the BS for communications using the first configuration parameters.

In some embodiments, establishing, by the first user equipment (UE), the connection with the base station may be based on a random access process. In some embodiments, the first configuration parameters may comprise random access parameters; and the random access process is based on random access parameters.

In some embodiments, the first UE may receive from the second UE, measurement configuration parameters, wherein the measurement configuration may be received by the second UE from the base station. In some embodiments the first user equipment (UE) may measure reference signals, associated with the cell, based on the measurement configuration parameters. In some embodiments, the first UE may determine that the condition is satisfied based on the measuring the reference signals. In some embodiments, the determining that the condition is satisfied may be based on signal strength of the reference signals being above a threshold. In some embodiments, the measurement configuration parameters may comprise a first parameter indicating the threshold.

The exemplary blocks and modules described in this disclosure with respect to the various example embodiments may be implemented or performed with a general-purpose processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. Examples of the general-purpose processor include but are not limited to a microprocessor, any conventional processor, a controller, a microcontroller, or a state machine. In some examples, a processor may be implemented using a combination of devices (e.g., a combination of a DSP and a microprocessor, multiple microprocessors, one or more microprocessors in conjunction with a DSP core, or any other such configuration).

The functions described in this disclosure may be implemented in hardware, software executed by a processor, firmware, or any combination thereof. Instructions or code may be stored or transmitted on a computer-readable medium for implementation of the functions. Other examples for implementation of the functions disclosed herein are also within the scope of this disclosure. Implementation of the functions may be via physically co-located or distributed elements (e.g., at various positions), including being distributed such that portions of functions are implemented at different physical locations.

Computer-readable media includes but is not limited to non-transitory computer storage media. A non-transitory storage medium may be accessed by a general purpose or special purpose computer. Examples of non-transitory storage media include, but are not limited to, random access memory (RAM), read-only memory (ROM), electrically erasable programmable ROM (EEPROM), flash memory, compact disk (CD) ROM or other optical disk storage, magnetic disk storage or other magnetic storage devices, etc. A non-transitory medium may be used to carry or store desired program code means (e.g., instructions and/or data structures) and may be accessed by a general-purpose or special-purpose computer, or a general-purpose or special-purpose processor. In some examples, the software/program code may be transmitted from a remote source (e.g., a website, a server, etc.) using a coaxial cable, fiber optic cable, twisted pair, digital subscriber line (DSL), or wireless technologies such as infrared, radio, and microwave. In such examples, the coaxial cable, fiber optic cable, twisted pair, DSL, or wireless technologies such as infrared, radio, and microwave are within the scope of the definition of medium. Combinations of the above examples are also within the scope of computer-readable media.

As used in this disclosure, use of the term "or" in a list of items indicates an inclusive list. The list of items may be prefaced by a phrase such as "at least one of" or "one or more of". For example, a list of at least one of A, B, or C includes A or B or C or AB (i.e., A and B) or AC or BC or ABC (i.e., A and B and C). Also, as used in this disclosure, prefacing a list of conditions with the phrase "based on" shall not be construed as "based only on" the set of conditions and rather shall be construed as "based at least in part on" the set of conditions. For example, an outcome described as "based on condition A" may be based on both a condition A and a condition B without departing from the scope of this disclosure.

In this specification the terms "comprise", "include" or "contain" may be used interchangeably and have the same meaning and are to be construed as inclusive and open-ending. The terms "comprise", "include" or "contain" may be used before a list of elements and indicate that at least all of the listed elements within the list exist but other elements that are not in the list may also be present. For example, if A comprises B and C, both {B, C} and {B, C, D} are within the scope of A.

The present disclosure, in connection with the accompanied drawings, describes example configurations that are not representative of all the examples that may be implemented or all configurations that are within the scope of this disclosure. The term "exemplary" should not be construed as "preferred" or "advantageous compared to other examples" but rather "an illustration, an instance or an example." By reading this disclosure, including the description of the embodiments and the drawings, it will be appreciated by a person of ordinary skills in the art that the technology disclosed herein may be implemented using alternative embodiments. The person of ordinary skill in the art would appreciate that the embodiments, or certain features of the embodiments described herein, may be combined to arrive at yet other embodiments for practicing the technology described in the present disclosure. Thus, the disclosure is not limited to the examples and designs described herein but is to be accorded the broadest scope consistent with the principles and novel features disclosed herein.

Clause 1. A method of handover in wireless communications comprising:
receiving, by a first user equipment (UE) from a first base station, one or more first messages comprising:
measurement configuration parameters; and
first configuration parameters comprising sidelink parameters, the first configuration parameters associated with a first cell;
establishing, by the first UE, a sidelink with a second UE based on the sidelink parameters;
transmitting, by the first UE to the first base station, a measurement report based on the measurement configuration parameters;
responsive to the transmitted measurement report, receiving, by the first UE from the first base station, a second message comprising second configuration parameters of a second cell of a second base station, wherein the second configuration parameters do not comprise sidelink parameters; and
switching, from the first cell of the first base station to the second cell of the second base station, wherein the sidelink of the first cell is handed over to an uplink of the second cell.

Clause 2. The method of Clause 1, further comprising measuring, by the first UE reference signals associated with the second cell of the second base station, wherein measuring the references signals associated with the second cell is based on the received measurement configuration parameters.

Clause 3. The method of the Clause 1, wherein transmitting the measurement report includes transmitting the measurement report via a radio resource control (RRC) message.

Clause 4. The method of Clause 1, wherein the first configuration parameters comprise sidelink resource pool configuration parameters, wherein establishing a sidelink with a second UE based on the sidelink parameters includes establishing the sidelink using radio resources identified in the sidelink resource pool configuration parameters.

Clause 5. The method of Clause 1, wherein the received second message is a handover command.

Clause 6. The method of Clause 5, further comprising initiating, by the first UE, a random access process with the second cell of the second base station.

Clause 7. The method of Clause 5, wherein the handover command corresponds to a conditional handover command, the conditional handover command defining a condition for handover.

Clause 8. The method of Clause 7, further comprising initiating, by the first UE, a random access process with the second cell of the second base station responsive to a determination that the defined condition has been satisfied.

Clause 9. The method of Clause 8, wherein the second configuration parameters of the second cell include the random access parameters, the random access parameters based on random access parameters associated with the second cell.

Clause 10. The method of Clause 7, wherein the defined condition is associated with a measured quality attributable to the second cell.

Clause 11. The method of Clause 1, wherein the second message comprises an RRC) reconfiguration message include the second configuration parameters of the second cell of the second base station.

Clause 12. The method of Clause 1, wherein the first cell is configured with downlink and sidelink information.

Clause 13. The method of Claim 12, wherein the first cell is not configured with uplink information.

Clause 14. The method of Claim 12, wherein the first cell is configured with uplink information.

Clause 15. The method of Claim 1, wherein the second cell is configured with downlink and uplink information.

Clause 16. The method of Claim 14, wherein the second cell is not configured with sidelink information.

Clause 17. The method of Claim 14, wherein the second cell is configured with sidelink information.

Clause 18. A method of handover in wireless communications comprising:
transmitting, by a first base station to a first user equipment (UE), one or more first messages comprising:
measurement configuration parameters; and
first configuration parameters comprising sidelink parameters, wherein the first configuration parameters are associated with a first cell;
receiving, by the first base station from the first UE, a measurement report based on the measurement configuration parameters;
responsive to the measurement report, transmitting, by the first base station to the second base station, a handover request message for handover of the first UE from the first cell of the first base station to a second cell of the second base station;
receiving, by the first base station from the second base station, a handover request acknowledge message comprising second configuration parameters of the second cell of the second base station, wherein the second configuration parameters do not comprise sidelink parameters; and
transmitting, by the first base station to the first UE, a second message comprising the second configuration parameters indicating a handover from the sidelink of the first cell to an uplink of the second cell.

Clause 19. The method of Clause 18, further comprising receiving, by the first base station from the second base station, a third message comprising cell parameters, associated with the second cell, the cell parameter defining that the second cell is not configured with sidelink communications.

Clause 20. The method of Clause 19, wherein the third message is an Xn setup response message.

Clause 21. The method of Clause 20, further comprising transmitting, by the first base station to the second base station, an Xn setup request message.

Clause 22. The method of Clause 19, further comprising determining, by the first base station, a handover of the first user equipment (UE) from the first cell of the first base station to a second cell of the second base station based on the cell parameters.

Clause 23. The method of Clause 22, further comprising determining, by the first base station, to handover the first user equipment (UE) from the first cell configured with sidelink to the second cell not configured with sidelink.

Clause 24. The method of Clause 19, wherein the second message comprises an information element indicating that sidelink communications is not available for the second cell.

Clause 25. The method of Clause 24, wherein the information element is a Boolean parameter and wherein a value of the Boolean parameter indicates that sidelink communications is not available for the second cell.

26. The method of Clause 18, wherein the second message comprises a radio resource control (RRC) reconfiguration message comprising the second configuration parameters of the second cell of the second base station.

Clause 27. The method of Clause 18, wherein:
the measurement configuration parameters comprise configuration parameters of reference signals; and
the measurement report is based on measurement of the reference signals.

Clause 28. The method of Clause 18, wherein the handover request message is an Xn application protocol message and wherein transmitting the handover request message includes transmitting the handover request message via an Xn interface between the first base station and the second base station.

Clause 29. The method of Clause 18, wherein the handover request message includes one or more of a source user equipment (UE) identifier information element; a handover cause information element; a target cell identifier information element; and UE context information.

Clause 30. A method of handover in wireless communications comprising:
receiving, by a first user equipment (UE) from a first base station, one or more first messages comprising:
measurement configuration parameters; and
first configuration parameters, of a first cell, not comprising sidelink parameters;
transmitting, by the first UE to the first base station, a measurement report based on the measurement configuration parameters;
responsive to the transmitted measurement report, receiving, by the first UE from the first base station, a second message comprising second configuration parameters of a second cell of a second base station, wherein the second configuration parameters comprise sidelink parameters; and
switching, from the first cell of the first base station to the second cell of the second base station, wherein an uplink of the first cell is handed over to the sidelink of the second cell.

Clause 31. The method of Clause 30, wherein the second configuration parameters comprise sidelink resource pool configuration parameters of a sidelink resource pool on the second cell.

Clause 32. The method of Clause 31, further comprising, responsive to the handover, establishing a sidelink, by the first user equipment (UE) with a second UE, using radio resources of the sidelink resource pool of the second cell.

Clause 33. The method of Clause 30, wherein:
the second cell is configured with downlink and sidelink; and
the second cell is not configured with uplink.

Clause 34. The method of Clause 30, wherein the second cell is configured with configuration parameters associated with downlink, uplink and sidelink.

Clause 35. A method of handover in wireless communications comprising:
transmitting, by a first base station to a first user equipment (UE), one or more first messages comprising:
measurement configuration parameters; and
first configuration parameters, of a first cell, not comprising sidelink parameters;
receiving, by the first base station from the first UE, a measurement report based on the measurement configuration parameters;
responsive to the received measurement report, transmitting, by the first base station to the second base station, a handover request message for handover of the first UE from the first cell of the first base station to a second cell of the second base station;
receiving, by the first base station from the second base station, a handover request acknowledge message comprising second configuration parameters of the second cell of the second base station, wherein the second configuration parameters comprise sidelink parameters; and
transmitting, by the first base station to the first UE, a second message comprising the second configuration parameters indicating a handover from an uplink of the first cell to the sidelink of the second cell.

Clause 36. The method of Clause 35, further comprising receiving, by the first base station from the second base station, a third message comprising cell parameters associated with the second cell, wherein the cell parameters indicate that the second cell is configured with sidelink communications.

Clause 37. The method of Clause 36, further comprising determining, by the first base station, a handover of the first UE from the first cell of the first BS to a second cell of the second base station based on the cell parameters.

Clause 38. The method of Clause 37, further comprising determining, by the first base station, a handover of the first UE from the first cell not configured with sidelink to the second cell configured with sidelink.

Clause 39. The method of Clause 36, wherein the third message comprises an information element indicating that the second cell is available for sidelink communications.

Clause 40. A method of handover in wireless communications comprising:
receiving, by a first user equipment (UE) from a second UE, first configuration parameters of a cell and conditional handover configuration parameters, wherein:
the first configuration parameters and the conditional handover configuration parameters are received by the second UE from a base station;
the second UE is in a coverage area of the base station and communicates with the base station using an uplink and a downlink configured for the cell;
the receiving the configuration parameters is while the first UE is not in the coverage area of the base station; and
the conditional handover configuration parameters indicate a condition for establishing a connection on the cell with the base station;
determining, by the first UE and based on the conditional handover configuration parameters, that the condition is satisfied; and
establishing, by the first UE, a connection with the base station for communications using the first configuration parameters.

Clause 41. The method of Clause 36, wherein establishing, by the first user equipment (UE), the connection with the base station is based on a random access process.

Clause 42. The method of Clause 37, wherein:
the first configuration parameters comprise random access parameters; and
the random access process is based on random access parameters.

Clause 43. The method of Clause 40, further comprising receiving, by the first user equipment (UE) from the second UE, measurement configuration parameters, wherein the measurement configuration are received by the second UE from the base station.

Clause 44. The method of Clause 43, further comprising measuring, by the first user equipment (UE), reference signals, associated with the cell, based on the measurement configuration parameters.

Clause 45. The method of Clause 44, wherein the determining that the condition is satisfied includes determining that the condition is satisfied based on the measuring the reference signals.

Clause 46. The method of Clause 45, wherein the determining that the condition is satisfied includes determining that the condition is satisfied based on signal strength of the reference signals being above a threshold.

Clause 47. The method of Clause 46, wherein the measurement configuration parameters comprise a first parameter indicating the threshold.

Clause 48. An apparatus for utilization in wireless communications comprising:
an antenna for use in transmission of electromagnetic signals;
a memory for maintaining computer-readable code; and
a processor for executing the computer-readable code that causes the apparatus to:
receive, from a first base station, one or more first messages comprising:
measurement configuration parameters; and
first configuration parameters comprising sidelink parameters, the first configuration parameters associated with a first cell;
establish a sidelink with a second UE based on the sidelink parameters;
transmit, to the first base station, a measurement report based on the measurement configuration parameters;
responsive to the measurement report, receive, from the first base station, a second message comprising second configuration parameters of a second cell of a second base station, wherein the second configuration parameters do not comprise sidelink parameters; and
switch, from the first cell of the first base station to the second cell of the second base station, wherein the sidelink of the first cell is handed over to an uplink of the second cell.

Clause 49. The apparatus of Clause 1, further comprising measuring, by the first UE reference signals associated with the second cell of the second base station, wherein measuring the references signals associated with the second cell is based on the received measurement configuration parameters.

Clause 50. The apparatus of the Clause 48, wherein the apparatus transmits the measurement report via a radio resource control (RRC) message.

Clause 51. The apparatus of Clause 48, wherein the first configuration parameters comprise sidelink resource pool configuration parameters, wherein the apparatus establishes the sidelink using radio resources identified in the sidelink resource pool configuration parameters.

Clause 52. The apparatus of Clause 48, wherein the received second message is a handover command.

Clause 53. The apparatus of Clause 52, wherein the apparatus initiates a random access process with the second cell of the second base station.

Clause 54. The apparatus of Clause 52, wherein the handover command corresponds to a conditional handover command, the conditional handover command defining a condition for handover.

Clause 55. The apparatus of Clause 54, wherein the apparatus initiates a random access process with the second cell of the second base station responsive to a determination that the defined condition has been satisfied.

Clause 56. The apparatus of Clause 55, wherein the second configuration parameters of the second cell include the random access parameters, the random access parameters based on random access parameters associated with the second cell.

Clause 57. The apparatus of Clause 54, wherein the defined condition is associated with a measured quality attributable to the second cell.

Clause 58. The apparatus of Clause 48, wherein the second message comprises an RRC) reconfiguration message include the second configuration parameters of the second cell of the second base station.

Clause 59. The apparatus of Clause 48, wherein the first cell is configured with downlink and sidelink information.

Clause 60. The apparatus of Claim 59, wherein the first cell is not configured with uplink information.

Clause 61. The apparatus of Claim 59, wherein the first cell is configured with uplink information.

Clause 62. The apparatus of Claim 48, wherein the second cell is configured with downlink and uplink information.

Clause 63. The apparatus of Claim 61, wherein the second cell is not configured with sidelink information.

Clause 64. The apparatus of Claim 61, wherein the second cell is configured with sidelink information.

Clause 65. An apparatus for utilization in wireless communications comprising:
an antenna for use in transmission of electromagnetic signals;
a memory for maintaining computer-readable code; and
a processor for executing the computer-readable code that causes the apparatus to:
transmit, to a first user equipment (UE), one or more first messages comprising:
measurement configuration parameters; and
first configuration parameters comprising sidelink parameters, wherein the first configuration parameters are associated with a first cell;
receive, from the first UE, a measurement report based on the measurement configuration parameters;
responsive to the measurement report, transmit, to the second base station, a handover request message for handover of the first UE from the first cell of the first base station to a second cell of the second base station;
receive, from the second base station, a handover request acknowledge message comprising second configuration parameters of the second cell of the second base station, wherein the second configuration parameters do not comprise sidelink parameters; and transmit, to the first UE, a second message comprising the second configuration parameters indicating a handover from the sidelink of the first cell to an uplink of the second cell.

Clause 66. The apparatus of Clause 65, wherein the apparatus receives, from the second base station, a third message comprising cell parameters, associated with the second cell, the cell parameter defining that the second cell is not configured with sidelink communications.

Clause 67. The apparatus of Clause 66, wherein the third message is an Xn setup response message.

Clause 68. The apparatus of Clause 67, wherein the apparatus transmits, to the second base station, an Xn setup request message.

Clause 69. The apparatus of Clause 66, wherein the apparatus determines a handover of the first user equipment (UE) from the first cell of the first base station to a second cell of the second base station based on the cell parameters.

Clause 70. The apparatus of Clause 69, wherein the apparatus determines to handover the first user equipment (UE) from the first cell configured with sidelink to the second cell not configured with sidelink.

Clause 71. The apparatus of Clause 19, wherein the second message comprises an information element indicating that sidelink communications is not available for the second cell.

Clause 72. The apparatus of Clause 71, wherein the information element is a Boolean parameter and wherein a value of the Boolean parameter indicates that sidelink communications is not available for the second cell.

Clause 73. The apparatus of Clause 65, wherein the second message comprises a radio resource control (RRC) reconfiguration message comprising the second configuration parameters of the second cell of the second base station.

Clause 74. The apparatus of Clause 65, wherein:
the measurement configuration parameters comprise configuration parameters of reference signals; and
the measurement report is based on measurement of the reference signals.

Clause 75. The apparatus of Clause 65, wherein the handover request message is an Xn application protocol message and wherein the apparatus transmits the handover request message via an Xn interface between the first base station and the second base station.

Clause 76. The apparatus of Clause 65, wherein the handover request message includes one or more of a source user equipment (UE) identifier information element; a handover cause information element; a target cell identifier information element; and UE context information.

Clause 77. An apparatus for utilization in wireless communications comprising:
an antenna for use in transmission of electromagnetic signals;
a memory for maintaining computer-readable code; and
a processor for executing the computer-readable code that causes the apparatus to:
receive, from a first base station, one or more first messages comprising:
measurement configuration parameters; and
first configuration parameters, of a first cell, not comprising sidelink parameters;
transmit, to the first base station, a measurement report based on the measurement configuration parameters;
responsive to the transmitted measurement report, receive, from the first base station, a second message comprising second configuration parameters of a second cell of a second base station, wherein the second configuration parameters comprise sidelink parameters; and
switch, from the first cell of the first base station to the second cell of the second base station, wherein an uplink of the first cell is handed over to the sidelink of the second cell.

Clause 78. The apparatus of Clause 77, wherein the second configuration parameters comprise sidelink resource pool configuration parameters of a sidelink resource pool on the second cell.

Clause 79. The apparatus of Clause 78, wherein the apparatus, responsive to the handover, establishes a sidelink, by the first user equipment (UE) with a second UE, using radio resources of the sidelink resource pool of the second cell.

Clause 80. The apparatus of Clause 77, wherein:
the second cell is configured with downlink and sidelink; and
the second cell is not configured with uplink.

81. The apparatus of Clause 77, wherein the second cell is configured with configuration parameters associated with downlink, uplink and sidelink.

Clause 82. An apparatus for utilization in wireless communications comprising:
an antenna for use in transmission of electromagnetic signals;
a memory for maintaining computer-readable code; and
a processor for executing the computer-readable code that causes the apparatus to:
transmit, to a first user equipment (UE), one or more first messages comprising:
measurement configuration parameters; and
first configuration parameters, of a first cell, not comprising sidelink parameters;
receive, from the first UE, a measurement report based on the measurement configuration parameters;
responsive to the received measurement report, transmit, to the second base station, a handover request message for handover of the first UE from the first cell of the first base station to a second cell of the second base station;
receive, from the second base station, a handover request acknowledge message comprising second configuration parameters of the second cell of the second base station, wherein the second configuration parameters comprise sidelink parameters; and
transmit, to the first UE, a second message comprising the second configuration parameters indicating a handover from an uplink of the first cell to the sidelink of the second cell.

Clause 83. The apparatus of Clause 82, wherein the apparatus, receives, from the second base station, a third message comprising cell parameters associated with the second cell, wherein the cell parameters indicate that the second cell is configured with sidelink communications.

Clause 84. The apparatus of Clause 83, wherein the apparatus determines a handover of the first UE from the first cell of the first BS to a second cell of the second base station based on the cell parameters.

Clause 85. The apparatus of Clause 84, wherein the apparatus determines a handover of the first UE from the first cell not of the first BS configured with sidelink to the second cell configured with sidelink.

Clause 86. The apparatus of Clause 36, wherein the third message comprises an information element indicating that the second cell is available for sidelink communications.

Clause 87. An apparatus for utilization in wireless communications comprising:

an antenna for use in transmission of electromagnetic signals;

a memory for maintaining computer-readable code; and a processor for executing the computer-readable code that causes the apparatus to:

receive, from a second UE, first configuration parameters of a cell and conditional handover configuration parameters, wherein:

the first configuration parameters and the conditional handover configuration parameters are received by the second UE from a base station;

the second UE is in a coverage area of the base station and communicates with the base station using an uplink and a downlink configured for the cell;

the receiving the configuration parameters is while the first UE is not in the coverage area of the base station; and the conditional handover configuration parameters indicate a condition for establishing a connection on the cell with the base station;

determine, based on the conditional handover configuration parameters, that the condition is satisfied; and establish a connection with the base station for communications using the first configuration parameters.

88. The apparatus of Clause 83, wherein the apparatus establishes the connection with the base station based on a random access process.

Clause 89. The apparatus of Clause 83, wherein:

the first configuration parameters comprise random access parameters; and the random access process is based on random access parameters.

Clause 90. The apparatus of Clause 40, wherein the apparatus receives, from the second UE, measurement configuration parameters, wherein the measurement configuration are received by the second UE from the base station.

Clause 91. The apparatus of Clause 90, wherein the apparatus measures reference signals, associated with the cell, based on the measurement configuration parameters.

Clause 92. The apparatus of Clause 91, wherein the determining that the condition is satisfied includes determining that the condition is satisfied based on the measuring the reference signals.

Clause 93. The apparatus of Clause 92, wherein the determining that the condition is satisfied includes determining that the condition is satisfied based on signal strength of the reference signals being above a threshold.

Clause 94. The apparatus of Clause 93, wherein the measurement configuration parameters comprise a first parameter indicating the threshold.

The invention claimed is:

1. A method of handover in wireless communications comprising:

receiving, by a first user equipment (UE) from a first base station, one or more first messages comprising:

measurement configuration parameters; and first configuration parameters comprising sidelink parameters, the first configuration parameters associated with a first cell;

establishing, by the first UE, a sidelink with a second UE based on the sidelink parameters;

transmitting, by the first UE to the first base station, a measurement report based on the measurement configuration parameters; and responsive to the transmitted measurement report, receiving, by the first UE from the first base station, a second message comprising second configuration parameters of a second cell of a second base station, wherein the second configuration parameters do not comprise sidelink parameters, wherein the first configuration parameters comprise sidelink resource pool configuration parameters, and wherein establishing a sidelink with a second UE based on the sidelink parameters includes establishing the sidelink using radio resources identified in the sidelink resource pool configuration parameters.

2. The method of claim 1, further comprising measuring, by the first UE reference signals associated with the second cell of the second base station, wherein measuring the references signals associated with the second cell is based on the received measurement configuration parameters.

3. The method of the claim 1, wherein transmitting the measurement report includes transmitting the measurement report via a radio resource control (RRC) message.

4. The method of claim 1, wherein the received second message is a handover command.

5. The method of claim 4, further comprising initiating, by the first UE, a random access process with the second cell of the second base station.

6. The method of claim 4, wherein the handover command corresponds to a conditional handover command, the conditional handover command defining a condition for handover.

7. The method of claim 6, further comprising initiating, by the first UE, a random access process with the second cell of the second base station responsive to a determination that the defined condition has been satisfied.

8. The method of claim 7, wherein the second configuration parameters of the second cell include the random access parameters, the random access parameters based on random access parameters associated with the second cell.

9. The method of claim 6, wherein the defined condition is associated with a measured quality attributable to the second cell.

10. The method of claim 1, wherein the second message comprises an RRC reconfiguration message include the second configuration parameters of the second cell of the second base station.

11. The method of claim 1, wherein the first cell is configured with downlink and sidelink information.

12. The method of claim 11, wherein the first cell is not configured with uplink information.

13. The method of claim 11, wherein the first cell is configured with uplink information.

14. The method of claim 13, wherein the second cell is not configured with sidelink information.

15. The method of claim 14, wherein the second cell is configured with sidelink information.

16. The method of claim 1, wherein the second cell is configured with downlink and uplink information.

17. A method of handover in wireless communications comprising:
  transmitting, by a first base station to a first user equipment (UE), one or more first messages comprising:
    measurement configuration parameters; and
    first configuration parameters comprising sidelink parameters, wherein the first configuration parameters are associated with a first cell, and wherein the first configuration parameters comprise sidelink resource pool configuration parameters configured to enable the first UE to establish a sidelink with a second UE based on the sidelink parameters, the sidelink using radio resources identified in the sidelink resource pool configuration parameters;
  receiving, by the first base station from the first UE, a measurement report based on the measurement configuration parameters;
  responsive to the measurement report, transmitting, by the first base station to a second base station, a handover request message for handover of the first UE from the first cell of the first base station to a second cell of the second base station;
  receiving, by the first base station from the second base station, a handover request acknowledge message comprising second configuration parameters of the second cell of the second base station, wherein the second configuration parameters do not comprise sidelink parameters.

18. The method of claim 17, further comprising receiving, by the first base station from the second base station, a third message comprising cell parameters, associated with the second cell, the cell parameter defining that the second cell is not configured with sidelink communications.

19. The method of claim 18, wherein the third message is an Xn setup response message.

20. The method of claim 19, further comprising transmitting, by the first base station to the second base station, an Xn setup request message.

21. The method of claim 18, further comprising determining, by the first base station, a handover of the first user equipment (UE) from the first cell of the first base station to a second cell of the second base station based on the cell parameters.

22. The method of claim 21, further comprising determining, by the first base station, to handover the first user equipment (UE) from the first cell configured with sidelink to the second cell not configured with sidelink.

23. The method of claim 18, transmitting, by the first base station to the first UE, a second message comprising the second configuration parameters indicating a handover from the sidelink of the first cell to an uplink of the second cell, wherein the second message comprises an information element indicating that sidelink communications is not available for the second cell.

24. The method of claim 23, wherein the information element is a Boolean parameter and wherein a value of the Boolean parameter indicates that sidelink communications is not available for the second cell.

25. The method of claim 17, transmitting, by the first base station to the first UE, a second message comprising the second configuration parameters indicating a handover from the sidelink of the first cell to an uplink of the second cell, wherein the second message comprises a radio resource control (RRC) reconfiguration message comprising the second configuration parameters of the second cell of the second base station.

26. The method of claim 17, wherein:
  the measurement configuration parameters comprise configuration parameters of reference signals; and
  the measurement report is based on measurement of the reference signals.

27. The method of claim 17, wherein the handover request message is an Xn application protocol message and wherein transmitting the handover request message includes transmitting the handover request message via an Xn interface between the first base station and the second base station.

28. The method of claim 17, wherein the handover request message includes one or more of a source user equipment (UE) identifier information element; a handover cause information element; a target cell identifier information element; and UE context information.

* * * * *